(12) United States Patent
Shimogori et al.

(10) Patent No.: US 7,165,166 B2
(45) Date of Patent: Jan. 16, 2007

(54) DATA PROCESSING SYSTEM, DATA PROCESSING APPARATUS AND CONTROL METHOD FOR A DATA PROCESSING APPARATUS

(75) Inventors: Shintaro Shimogori, Tokyo (JP); Shoichi Kamano, Tokyo (JP); Toshiaki Kitajima, Tokyo (JP)

(73) Assignee: Pacific Design, Inc., Tokyo (JP)

( * ) Notice: Subject to any disclaimer, the term of this patent is extended or adjusted under 35 U.S.C. 154(b) by 843 days.

(21) Appl. No.: 10/053,737

(22) Filed: Jan. 24, 2002

(65) Prior Publication Data

US 2002/0103986 A1 Aug. 1, 2002

(30) Foreign Application Priority Data

Jan. 31, 2001 (JP) .................................. 2001-024513
Sep. 26, 2001 (JP) .................................. 2001-294546

(51) Int. Cl.
*G06F 15/163* (2006.01)

(52) U.S. Cl. ....................................................... 712/34
(58) Field of Classification Search .................. 712/32, 712/34, 36, 35, 209
See application file for complete search history.

(56) References Cited

U.S. PATENT DOCUMENTS

| | | | |
|---|---|---|---|
| 4,395,758 A | 7/1983 | Helenius et al. | |
| 4,648,034 A | 3/1987 | Heninger | |
| 4,829,420 A | 5/1989 | Stähle | |

(Continued)

FOREIGN PATENT DOCUMENTS

| | | |
|---|---|---|
| EP | 0 174 231 A1 | 3/1986 |
| EP | 0 588 341 A2 | 3/1994 |
| EP | 0 628 917 A2 | 6/1994 |
| EP | 0 671 685 A2 | 9/1995 |
| GB | 2 225 881 A | 6/1990 |
| GB | 2 230 119 A | 10/1990 |
| GB | 2 232 514 A | 12/1990 |
| JP | 2000-112585 | 4/2000 |
| JP | 2000-207202 | 7/2000 |
| WO | 95/19006 | 7/1995 |
| WO | 01/44964 A2 | 6/2001 |

OTHER PUBLICATIONS

U.S. Appl. No. 10/320,622 "Data Processing System".
U.S. Appl. No. 10/109,650 "Data Processing System and Design System".
U.S. Appl. No. 09/860,563.
U.S. Appl. No. 09/933,819.
U.S. Appl. No. 09/985,087.
U.S. Appl. No. 10/175,446 "Data Processing System and Control Method".

(Continued)

*Primary Examiner*—Eric Coleman
(74) *Attorney, Agent, or Firm*—Burns, Doane, Swecker & Mathis, L.L.P.

(57) ABSTRACT

A data processing system includes the data processing apparatuses formed with the VUPU architecture by combining a general-purpose data processing unit and a special-purpose data processing unit equipped with a data path unit for specialized data processing that is executed according to special-purpose instructions, and equipping the general-purpose data processing unit with a communication function for communicating with the general-purpose data processing unit in another data processing apparatus. In this invention, these data processing apparatuses are combined to form the system with plurality of specialized circuits, therefore, the data processing system in which parallel processing is performed by a plurality of specialized circuits can be provided economically and in a short time.

30 Claims, 20 Drawing Sheets

U.S. PATENT DOCUMENTS

| | | | |
|---|---|---|---|
| 4,860,191 A | | 8/1989 | Nomura et al. |
| 5,430,850 A | | 7/1995 | Papadopoulos et al. |
| 5,450,553 A | | 9/1995 | Kitagaki et al. |
| 5,487,173 A | | 1/1996 | Greiss et al. |
| 5,495,588 A | | 2/1996 | Gibart et al. |
| 5,630,153 A | * | 5/1997 | Intrater et al. ................ 712/35 |
| 5,740,404 A | * | 4/1998 | Baji ........................... 711/167 |
| 5,870,602 A | | 2/1999 | Miller et al. |
| 5,894,582 A | | 4/1999 | Yoshida et al. |
| 5,903,744 A | | 5/1999 | Tseng et al. |
| 5,911,082 A | * | 6/1999 | Monroe et al. ................ 712/35 |
| 6,055,373 A | * | 4/2000 | McElroy et al. ............... 712/35 |
| 6,085,314 A | * | 7/2000 | Asghar et al. ............... 712/213 |
| 6,301,650 B1 | | 10/2001 | Satou |

OTHER PUBLICATIONS

U.S. Appl. No. 10/175,447 "Data Processing System and Control Method".

U.S. Appl. No. 10/171,750 "Data Processing System and Control Method".

* cited by examiner

FIG. 18A

```
static int*BtoA;                    ~71
static int*CtoA;                    PU-A
static int*DtoA;
static int*AtoAll;

...

BtoA=0x0000       ~71g
AtoAll=0x4000;    ~71a

...

while (BtoA(0)=1);    ~71h

AtoAll(0)=1;    ~71i
AtoAll(1)=1;    ~71j
AtoAll(0)=0;    ~71k
```

FIG. 18B

```
                                    ~72
static int*AtoB;    ~72a            PU-B
AtoB=0xC000;
BtoA=0x0000    ~72g while (AtoB(0)=1);    ~72h BtoA(0)=1;    ~72i
val=AtoB(1);  ~72j
BtoA(0)=0;    ~72k
```

DATA PROCESSING SYSTEM, DATA PROCESSING APPARATUS AND CONTROL METHOD FOR A DATA PROCESSING APPARATUS

BACKGROUND OF THE INVENTION

1. Technical Field

The present invention relates to a data processing apparatus that is equipped with a special-purpose data processing unit including a data path on which computational processes are executed by hardware, and also to a data processing system that has such data processing apparatus.

2. Description of the Related Art

During the past decades, there have been great increases in the size and packing density of large-scale integrated circuits (hereafter, referred to as SIs. In recent years, systems capable of extremely advanced functioning have been produced on silicon as system LSIs and other such processors. Along with these advances and aside from the development of high-speed, high-performance standard or general-purpose LSIs such as the Pentium (registered trademark) line of processors produced by Intel, there has been an increase in demand for system LSIs for specialized purposes that are designed so as to give high performance for the specialized computation for which the LSIs are used. There has also been an increase in demand for system LSIs that are more cost-effective than general-purpose LSIs but still achieve satisfactory performance for a chosen application. One example of such LSIs are the LSIs used in mobile phones and the like where low power consumption is required. Another example are LSIs that are suited to the transfer of data or packets in real time, such as those used in network devices. Yet another example are LSIs that are suited to the compression and decompression of image data for use when transferring image data. In this way, the demand for specialized LSIs is especially prevalent in the fields of communication networks and domestic information appliances, such as digital television.

In response to such demands, the techniques for producing dedicated or special purpose system LSIs are in the development. When a large-scale dedicated system LSI is required, the functioning of the system LSI, which is to say, the specification, is first written out using a high-level programming language such as C or JAVA (registered trademark). As a result, a processor that is equipped with a compiling funciton or the like that can execute the code written in the high-level programming language, or a processor that is otherwise suited to such developing environment using the high-level language is required. A specialized processor that is equipped with a function for performing a special-purpose instruction for a desired purpose may be equipped with a specialized circuit that can handle the processing written in the high-level language. This makes it possible to provide a system LSI with very high cost-performance.

On the other hand, one conventional technique for increasing processing speed is to perform parallel processing using a multiprocessor arrangement. If a single program written in C language can be divided to produce a plurality of processes that can be executed in a parallel, a large increase in processing speed can be achieved. As another problem, computational processes which are rarely installed in the general-purpose processor costs many clock cycles when executed in the general-purpose processor. By designing a system so that such processes are executed by specialized or dedicated data processing circuits using special-purpose instructions, and then having such processes performed in parallel by the specialized or special-purpose data processing circuits, processing speed becomes highly increased.

When the specification or system written in C language is divided into a plurality of processes for processing by specialized circuits designed for these processes, each specialized circuits shall have a communication function for informing the processing states each other for controlling the processes to be executed in parallel.

It is also necessary to provide a function for controlling the processing in the specialized circuits based on the results of such communication. Depending on the application in which the processor is used, a variety of calculations needs to be performed. Therefore, specialized circuits that have at least the both functions for coping with each of these calculations and for coping with the operation in parallel shall be developed in each application or system.

As a result, while it is thought that a system LSI that performs parallel processing using specialized circuits would be able to operate at a high processing speed, the designing and testing of such a system LSI are very time-consuming and incur a huge cost. This makes it difficult to provide such LSIs in a timely fashion and results in poor cost-performance, with there being no conventional solution to this problem.

The present invention has a first object of providing a data processing system and a data processing apparatus that can quickly and economically develop system LSIs in which a plurality of specialized circuits operate in parallel. The present invention has a second object of providing a data processing system and a data processing apparatus that can quickly and economically develop system LSIs in which a plurality of processes produced by dividing a program written in a high-level programming language such as C can be distributed and executed in parallel.

A further object of the present invention is to provide a data processing system and a data processing apparatus that can quickly and economically provide a system equipped with a plurality of specialized circuits in the form of a large scale system written in C language or the like, the system using a communication function and being able to cope with code that has been written in C language or JAVA without the system designer having to consider the hardware.

SUMMARY OF THE INVENTION

The applicant of the present invention has disclosed a data processing apparatus that is equipped with customizable special-purpose instructions in U.S. Pat. No. 6,301,650. This data processing apparatus includes a VU unit that is a special-purpose data processing unit and a PU unit that corresponds to a RISC processor that can execute standard data processing. We refer to such architecture as VUPU architecture and in the VUPU architecture, unlike the PU unit, the VU unit can operate using multicycles so that extensive processing can be performed according to special-purpose instructions.

In this invention, data processing apparatuses are provided, the data processing apparatuses are formed with the VUPU architecture by combining a general-purpose data processing unit and a special-purpose data processing unit equipped with a specialized circuit which is a data path unit or portion for specialized data processing that is executed according to special-purpose instructions, and equipping the general-purpose data processing unit with a communication function for communicating with the general-purpose data processing unit in another data processing apparatus. Further, these data processing apparatuses are combined to form a system with plurality of specialized circuits. In this way, a data processing system in which parallel processing is performed by a plurality of specialized circuits can be provided economically and in a short time.

Program functions in some system specified by a high-level language such as C language can be converted into separate special-purpose instructions that is executed by special-purpose data processing units, so that the system specified by C language are divided into a plurality of processes and executed at high speed in parallel in the present data processing system. This means that the data processing system with high performance can be provided economically and in a short time.

Therefore, a data processing system according to the present invention includes a plurality of data processing apparatuses, at least two of the data processing apparatuses being type 1 data processing apparatuses, a type 1 data processing is a above mentioned VUPU type processor that includes: at least one special-purpose data processing unit that includes a data path portion for specialized data processing that is executed according to at least one special-purpose instruction; a general-purpose data processing unit for executing standard processing according to general-purpose instructions; and an instruction issuing unit for issuing instructions to the at least one special-purpose data processing unit and the general-purpose data processing unit, based on a program that includes the at least one special-purpose instruction and general-purpose instructions. Further, in the type 1 data processor for the processing system of this invention, the general-purpose data processing unit of the type 1 data processing apparatuses includes a communication means for exchanging data with the general-purpose data processing unit of at least one other type 1 data processing apparatus. In the scope of this invention, a data processing apparatus corresponding to the type 1 data processing apparatus itself that has the at least one special-purpose data processing unit, the general-purpose data processing unit and the instruction issuing unit, and a control method using the communication means are also included.

The special-purpose data processing unit of the present invention is equipped with a data path unit that is a specialized or dedicated circuit, which has been specially designed for the intended application, etc., so that special processing can be executed at high speed according to special-purpose instructions. On the other hand, the general-purpose data processing unit does not need to handle the special-purpose instructions and so only needs to be able to interpret and execute basic instructions or general-purpose instructions. As a result, by combining the special-data processing unit and the general-purpose data processing unit, the standard data processing unit, that is general-purpose data processing unit, can be used alongside special-purpose data processing units that correspond to a variety of applications without the ability of the general-purpose data processing unit to handle a wide range of programs being sacrificed.

In the VUPU architecture, the special-purpose data processing unit and the general-purpose data processing unit can be controlled based on a program that includes special-purpose instructions and general-purpose instructions. Therefore, the general-purpose data processing unit can controlled the special-purpose data processing unit, and the standard processing in the general-purpose processing unit can be performed based on the processing result of the special-purpose data processing unit. As a result, by providing the general-purpose data processing unit with the communication means that is required to perform parallel processing, a communication function can be incorporated into the apparatus separate from the specialized circuits, making it possible to control the communication function using a program.

Therefore, in the data processing system of this invention that includes a plurality of specialized circuits, the communication function required for having the specialized circuits operate in parallel does not affect the specialized circuits and can be easily provided using a standard construction that can be flexibly controlled by a program. This makes it possible to reduce the time required to design and develop data processing systems in which parallel processing is performed by a plurality of specialized circuits, so that such systems become provided at low cost. Since a program can control the communication function, such systems can flexibly cope with changes and corrections made at a later stage.

By the data processing arrangement of this invention, a system is provided that includes a plurality of data processing apparatuses for processing a single data stream using the special-purpose data processing units of the apparatuses. Also, a system is provided that includes a plurality of data processing apparatuses for processing a plurality of data processing stream using the special-purpose data processing units of a plurality of data processing apparatuses. Therefore, it becomes possible to provide, as a system LSI, a suitable data processing system and a data processing apparatus that can perform parallel processing for a plurality of processes produced by dividing a process specified in a high-level language such as C language.

When an entire system is specified in a high-level language such as C language and then being divided into a plurality of processes that are assigned to the data processing apparatuses of the present invention, there is the problem of how data is to be exchanged among the data processing apparatuses. In the art of data exchanging between processors, two widely-used conventional methods are applicable. One method uses buses and the other method uses specialized communication hardware macros. In the data processing system of the present invention, above-mentioned specialized communication hardware can be applied as the communication means. However, these methods have the disadvantage that are difficult for a developer who writes C language code to directly control and manage the data transfers by the above-mentioned specialized communication hardware. When the bus method is used, it is difficult to directly refer to the bus, which is hardware, from the C language level. As described above, it should be obvious that it is advantageous for programmers of a high-level language such as C language to be able to write code without having to directly consider the hardware. When data communication is performed using specialized communication hardware macros, the communication function is achieved by specialized hardware, so that it is difficult to perform precise control through programming at the C language level. In other words, the inter-processor data communication mechanisms that are currently widely used are constructed in a bottom-up fashion based on hardware requirements. Such mechanisms have not needed to be closely linked to C language, resulting in poor linkage between the mechanisms and C language.

However, in order to design a system LSI based on a specification described in C language according to the data processing system of the present invention, it is preferable to use a top-down design method for converting the system specified in C language into an LSI. It is preferable for the transferring of data to be performed freely without the programmer having to consider the hardware when writing C language code. If such communication means are provided, with the data processing system of the present invention, a system LSI is designed by producing a group of data processing apparatuses that are equipped with specialized circuits corresponding to a plurality of C language processes produced by dividing an entire system specified in C language. When the system specification is divided into the plurality C language processes, if the transfer of data can be programmed at the C language level without considering the hardware, the division into the plurality of C language processes become proceeding smoothly. For this reason, a hardware architecture for transferring data according to C language code without consideration of the hardware is required.

As a result, with the present invention, when inputting and outputting data according to general-purpose instructions, the address used when inputting and outputting data can be set so that data is inputted into the data memory of another data processing apparatus or is outputted to the data memory of another data processing apparatus. The data processing apparatus of the present invention has a code memory area (such as a program storage region in a memory, a code RAM or a code ROM) for storing a program and a data memory area (such as a data storage region in a memory or a data RAM) into and out of which data can be inputted and/or outputted according to at least one of general-purpose instructions. When the input address for inputting according to a general-purpose instruction is in a predetermined address area or range, the communication means exchanges data with another data processing apparatus by inputting data from the data memory area of the other data processing apparatus, that includes the data memory area are allocated or assigned to the other data processing apparatus. Also, when the output address for outputting data according to a general-purpose instruction is in a predetermined address range, the communication means exchanges data with another data processing apparatus by outputting data to the data memory of the other data processing apparatus. Therefore, the control method of the present invention for a data processing apparatus has a communication step for exchanging data with another data processing apparatus when the input address or output address for inputting or outputting data according to a general-purpose instruction is in a predetermined address range.

When data communication that inputs and outputs data into or out of from the data memory area of another data processing apparatus is performed, it is possible to use a PUT or PUSH (hereafter collectively referred to as a UT-type type arrangement for writing data in the data memory area of the other data processing apparatus with which communication is being performed. A GET-type arrangement is also applicable for reading data from the data memory area of the other data processing apparatus with which communication is being performed. With both types of arrangement, data transfer can be controlled at the C language level. With a communication unit or a communication step of the PUT-type data processing apparatus, data is transmitted to another data processing apparatus when an output address is a predetermined address or in a predetermined address range. Accordingly, in the transmitting side processor, at least one region in a data memory area of another data processing apparatus that is to receive data is treated as virtually existing memory area on a same level as the data memory area of the transmitting side data processor.

As a result, when the output destination for data is in the predetermined address range, data is written into the data memory area in the other data processing apparatus.

On the other hand, the communication means or communication step in a receiver data processing apparatus that communicates with the PUT-type data processing apparatus receives data from the transmitter data processing apparatus and stores the data at a corresponding address in the data memory area of itself. As a result, the received data is stored in the data memory area of the receiver data processing apparatus. This means that by reading data from address at the data was written in a program with C language code, the received data can be used by the general-purpose data processing unit of the received data processing apparatus. As a result, operations that transfer data between a transmitter and a receiver data processing apparatus is performed using C language.

In the communication process, a given address (start address and/or end address) may be provided and set in advance. The communication means will exchange the data when the address is equal to or higher than the given address, among another data processing apparatuses, while when the address is below the given address, the data is written into the data memory area in the data processing apparatus itself. In order to perform such control, a register is useful for storing information on the data processing apparatus with which communication is to be performed. The information includes, such as identification information for the data processing apparatus to which data is to be transmitted, a start address from which data transfer to this data processing apparatus is to start, and an address at which the transfer is to end, and is stored in this register in advance.

In the communication unit or the communication step of the GET-type data processing apparatus, data is received from another data processing apparatus when an input address is a predetermined address range. Accordingly at least one region in a data memory of another data processing apparatus that is to transmit data is treated as virtually existing on a same level as the data memory in the receiving side data processing apparatus. As a result, when the input source for data is in the predetermined address range, data can be read or input from the data memory area in another data processing apparatus.

The communication unit or communication step in a transmitting data processing apparatus that communicates with a GET-type data processing apparatus supplies data from a corresponding address in its data memory when data is requested by the receiving side or receiver data processing apparatus. Therefore, data written at a predetermined address range in the data memory area according to C language code is transferred to the receiver data processing apparatus. This means that with the GET-type arrangement also, operations that transfer data between a transmitter and a receiver data processing apparatus can be made using C language.

When a system is constructed by combining a plurality of data processing apparatuses using communication units, it is possible for all PUT-type or all GET-type data processing apparatuses to be used. When a system is also constructed so that one data processing apparatus operates as a upper (parent or master) and the data processing apparatuses that communicate with the parent data processing apparatus operate as lower (child or slave) data processing apparatuses. In such system, the constructions of the data processing apparatuses used as the master (parent) and slaves (children) can be all PUT-type or all GET-type. It is also possible to used a communication unit, in a child data processing apparatus, that has a unit for transmitting data to the parent data processing apparatus when an output address is in a predetermined address range and a unit for receiving data from the parent data processing apparatus when an input address is in a predetermined address range. Such type 1 processor becomes a first PUT/GET-type apparatus. In the same way, it is also possible to use a communication unit, in a parent data processing apparatus, that has a unit for transmitting data to a child data processing apparatus when an output address is in a predetermined address range and a unit for receiving data from a child data processing apparatus when an input address is in a predetermined address range. Such type 1 processor becomes a second PUT/GET-type apparatus.

The first PUT/GET type apparatus has the advantage of efficient use of memory space since the region into which data is inputted and outputted when transferring data between the child and parent apparatuses is concentrated in the parent apparatus. On the other hand, the second PUT/GET type apparatus has the advantage that the region into which data is inputted and outputted when transferring data between the child and parent apparatuses is distributed among the child apparatuses, making the child apparatuses more independent and further increasing the benefits of distributed processing.

In order to transfer data without errors, the memory region into which transferred data is written and out of which transferred data is read should preferably be designed so that a simultaneous input or output of data by the other (transmitter or receiver) data processing apparatus is not possible. In the data processing apparatus of the present invention, the timing at which data is transferred can be controlled by programs, so that programs for the receiver and transmitter data processing apparatuses can be made in C language so that the data processing apparatuses are controlled and so prevented from making simultaneous memory accesses. Alternatively, the communication unit may be equipped with an arbitration unit for delaying an operation of a unit for storing data when the general-purpose data processing unit is presently reading data from a dedicated reception region in the data memory area in which the unit for storing data is to store data, and for delaying an operation of the general-purpose data processing unit that reads data from a dedicated reception region when the unit for storing data is presently storing data. It is also useful an arbitration unit for delaying an operation of the means for supplying data when the general-purpose data processing unit is presently writing data into a dedicated transmission region in the data memory area from which the unit for supplying data obtains data, and for delaying an operation of the general-purpose data processing unit that writes data in the dedicated transmission region when the unit for supplying data is presently supplying data. Also, the method for controlling a data processing apparatus according to the present invention may perform control in the same way as the arbitration units described above.

In this way, the present invention provides a data processing system that includes a plurality of data processing apparatuses that each include at least one special-purpose data processing unit and a general-purpose data processing unit equipped with a communication unit. By using this system, a system LSI in which a plurality of specialized circuits operate in parallel can be provided in a short time and at a low cost. With the present invention, a communication function for communication among data processing apparatuses in a distributed processing system equipped with specialized circuits is realized by hardware that is closely linked to and corresponds to a high-level language, such as C language or JAVA (registered trademark). Accordingly, the transferring of data from one process to another process can be specified in C language. This makes it easy to produce a distributed processing system composed of a plurality of processes that are divided from some process specified in C language. As a result, from a specification of C language, a distributed-processing system LSI equipped with a plurality of high-speed specialized circuits is designed and produced in a short time and at a low cost.

Also, by providing at least one special-purpose data processing unit of at least one type 1 data processing apparatus (which is to say, a data processing with of a VUPU architecture) with a function for exchanging data with a type 2 data processing apparatus (such as a conventional standard or RISC processor), even greater flexibility is achieved when constructing a data processing system according to the present invention including such type 1 data processing apparatus.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 18A and FIG. 18B show examples of programs where C language is used to control the processing for a communication method where state signals are written into a reception RAM;

DESCRIPTION OF THE PREFERRED EMBODIMENT

Figure 1:
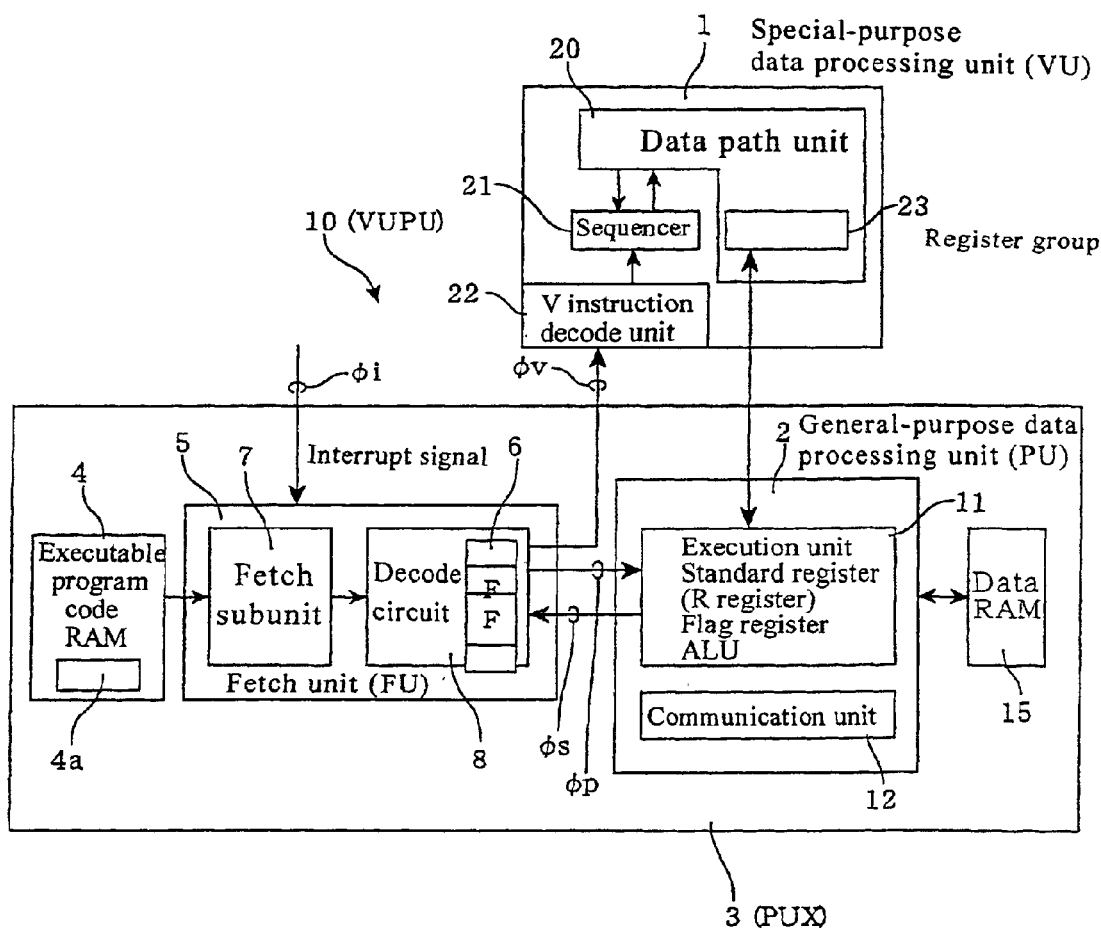
FIG. 1 shows a data processing apparatus (VUPU) according to the present invention that is equipped with a PU and a VU.

The following describes the present invention with reference to the attached drawings. FIG. 1 shows a simplification of a data processing apparatus 10 of the present invention, which includes a special-purpose data processing unit (a specialized data processing unit or a special-purpose instruction executing unit, hereafter referred to as the U 1 that is designed so as to perform specialized processing and a general-purpose data processing unit (a standard processing unit or a general-purpose instruction executing unit, hereafter referred to as the U 2 that has almost standard construction. This data processing apparatus 10 is a programmable processor that includes a specialized circuit, and so includes a fetch unit (hereafter referred to as the U 5 that fetches instructions from an executable control program (program code or microprogram code) 4a stored in a code RAM 4 and provides the VU 1 and PU 2 with decoded control signals. In the present example, the FU 5 corresponds to an instruction issuing unit.

The FU 5 includes a fetch subunit 7 and a decode unit 8. The fetch subunit 7 fetches an instruction from an address in the code RAM 4 according to the previous instruction, a state of state registers 6, or an interrupt signal φi. The decode unit 8 decodes the fetched instruction, which may be a special-purpose instruction or a general-purpose (standard) instruction. The decode unit 8 provides the VU 1 and the PU 2 respectively with decoded control signals φv produced by decoding special-purpose instructions and decoded control signals φp produced by decoding general-purpose instructions. An exec unit status signal φs showing the execution state is sent back from the PU 2, and the states of the PU 2 and the VU 1 are reflected in the state registers 6.

The PU 2 is equipped with a general-purpose execution unit 11, which includes general-purpose registers, flag registers, and an ALU (arithmetic logic unit), etc., and a communication unit 12, which is capable of exchanging data with another PU 2. The PU 2 executes general-purpose processing while inputting and outputting data to and from a data RAM 15 that is used as a temporary storage area. The constructions of the FU 5, the PU 2, the code RAM 4, and the data RAM 15 are similar to the equivalent components in a standard processor, with only their functioning being different. For this reason, a construction composed of the FU 5, the PU 2, the code RAM 4, and the data RAM 15 can be referred to as the rocessor unit 3 Therefore, the data processing apparatus 10 of the present embodiment has the processor unit (PUX) 3 and VU 1 and the processor unit (PUX) 3 controls the VU 1.

As mentioned above, the VU 1 executes a special-purpose instruction φv that is received from the FU 5. To do so, the VU 1 includes a unit 22 for performing decoding so as to recognize whether an instruction supplied by the FU 5 is the special-purpose instruction or decoded signal of that instruction (hereafter referred to as a V instruction) φv, a sequencer (finite state machine or "FSM") 21 that outputs, using hardware, control signals that have predetermined data processing performed, and a data path unit 20 that is designed so as to perform the predetermined or dedicated data processing in accordance with the control signals received from the sequencer 21. The VU 1 also includes a register 23 that can be accessed by the PU 2. The data that is required by the processing of the data path unit 20 is controlled and/or supplied by the PU 2 via an interface register 23, with the PU 2 being able to refer to the internal state of the VU 1 via this interface register 23. The result produced by the processing performed by the data path unit 20 is supplied or announced to the PU 2, with the PU 2 using or referring this result to perform further processing.

The data processing apparatus 10 has a program including general-purpose instructions (called instructions and special-purpose instructions (called instructions stored in the code RAM 4. These instructions are fetched by the FU 5 and control signals φp or φv produced by decoding these instructions are supplied to the VU 1 and the PU 2. To the VU 1, both of the control signals φp and φv are supplied and out of the control signals φp and φv, the VU 1 operates when it is supplied with the control signals φv that is the special-purpose instruction executed by the VU 1. On the other hand, the PU 2 is designed so as to be only supplied with the control signals φp produced by decoding a general-purpose instruction. The PU 2 is not supplied with control signals φv produced by decoding a special-purpose instruction and instead is issued with control signals indicating a nop instruction that does not cause the PU 2 to operate. In this way, processing by the PU 2 can be skipped.

The VU 1 may be changed depending on factors such as the application to be executed, with the special-purpose instructions to be executed by the VU 1 also changing depending on the application. This is to say, the VU 1 is a specialized circuit that is suited to a certain application, with it being easy to design the circuit so as to interpret control signals produced by decoding a V instruction. On the other hand, a nop instruction is outputted to the PU 2 since the PU 2 does not need to handle the specialized instructions for which the VU 1 is designed. The PU 2 only needs to be able to execute basic instructions or general-purpose instructions, so by applying PU 2 alongside VUs 1, a system suit to various applications is supplied without the processing performance for standard procedures being affected. Since in the system, by the PU 2 or PUX 3, the VUs 1 are controlled and processes using their processing results are performed.

An architecture (VUPU architecture) of the data processing apparatus 10 shown in FIG. 1, that has a VU 1, which is equipped with a specialized circuit for the specialized processing (such as that required for real-time response), and a PU 2, which is a general-purpose component, is useful for developing a system LSI or as a processor. It is also possible to design a system LSI or processor with the architecture that contains multiple combinations of VUs 1 and PUs 2. Hereafter in this specification, a processing unit or processing apparatus that is realized by a combination of a VU 1 and a PU 2 is referred to as a UPU The VUPU 10 is a processing unit generally has the merits that it can be designed and produced in a short time without affecting the real-time response capability of the processing unit, and it can cope with adjustments and corrections that are made at a later date or stage. The present construction is not restricted to including only one VU 1. Instead, a plurality of VUs 1 can be provided and the program code can include a plurality of special-purpose instructions that are executed by the respective VUs 1 for realizing specialized processing required by an application. Also, the VU 1 does not need to just perform specialized computations, but can be provided as a specialized circuit for a specific program function in the program. This makes it possible to execute the program efficiently.

In addition, the PUs 2 in the present embodiment are provided with a communication unit 12 that can exchange data with another PU 2. Since one VUPU 10 can communicate with another VUPUs 10, the VUs 1 in a plurality of VUPUs 10 can be operated in parallel. By having such an architecture, a data processing system that has a plurality of VUPUs 10 becomes adaptable to an extremely wide range of uses.

Figure 2:
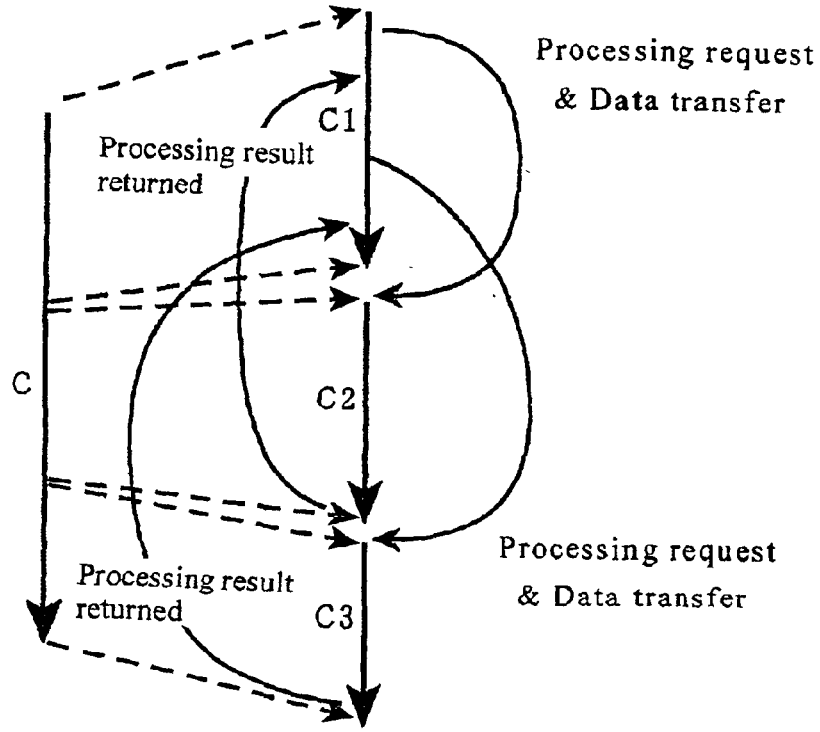
FIG. 2 shows how a process specified in C language is divided into a plurality of processes.
Figure 3:
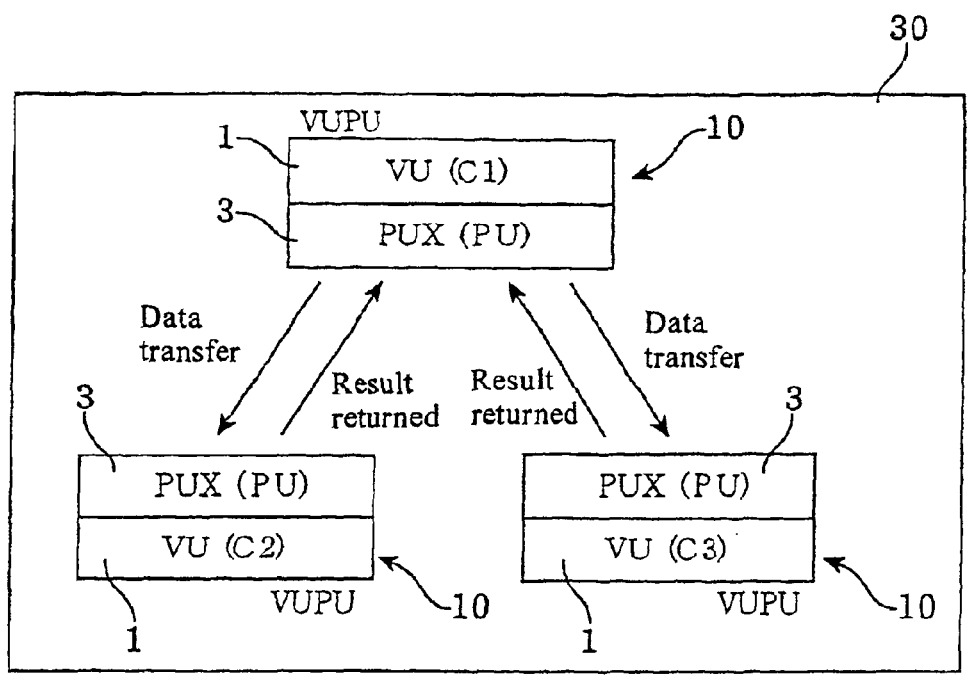
FIG. 3 shows a data processing system in which distributed processing is performed by data processing apparatuses.

In FIG. 2, the process specified in C language is considered. In the illustrated case, the process is composed of a upper (hereafter parent or master) process C1 and lower (hereafter chilled or slave) processes C2 and C3 that receive data from the process C1 and return calculation results based on this data. In this case, the processes C1, C2, and C3 are assigned to three VUPUs 10, as shown in FIG. 3. As mentioned above, VUPU 10 can apply not only to perform specialized computations but also to perform a specific program function in the program, so that processing speed of the usual C-language program can be increased.

Figure 4:
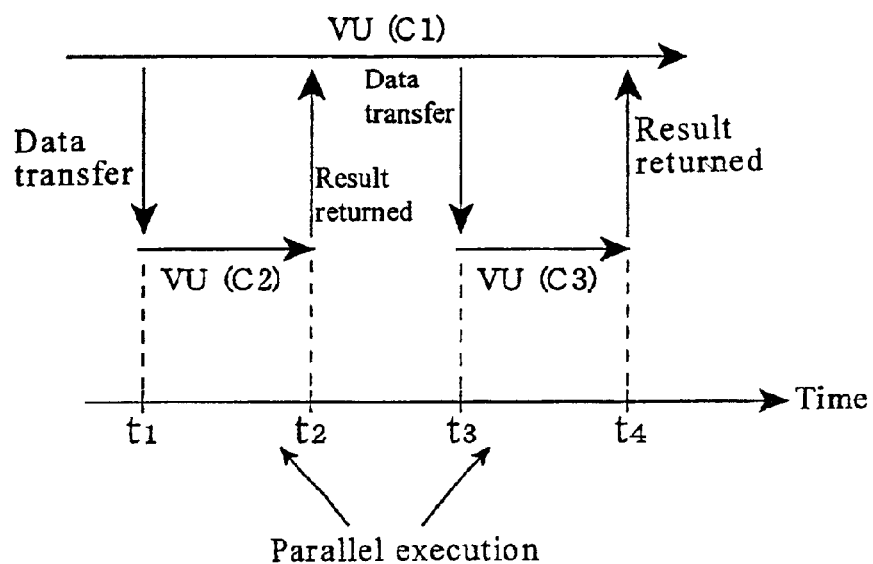
FIG. 4 shows execution states of each VUPU in the data processing system shown in FIG. 3.

In each VUPU 10 in FIG. 3, the PU 2 is equipped with a communication function. As shown in FIG. 4, the VU1 that is assigned the parent process (process C1) and equipped with VU(C1) for performing the process C1, transfers data to the VUPU 10 assigned the child or slave process C2 and equipped with VU(C2) for performing the process C2, so that processing by the VU(C2) commences in parallel with processing by the VU(C1). The VU(C2) returns the processing result to the VU(C1) so that the VU(C1) can execute further processing based on this processing result.

In the same way, from the VUPU 10 with VU(C1), data is transferred to the VUPU 10 that is equipped with VU(C3) for performing the process C3 and assigned, so that the VU(C3) can commence processing in parallel with the VU(C1). Also, when there is a process that can be executed in parallel by the VU(C2) and the VU(C3), a further increase in parallelism can be achieved, which further improves the processing speed. If only one of the VUPUs 10 is operable at a given time, parallel processing is not achieved, and the only effect gained is that a process that was originally written in C language can be performed by a specialized circuit. On the other hand, with the VUPU 10 of the present invention, it is possible for a plurality of processes that are executed by specialized circuits to be executed in parallel, resulting in a large increase in processing speed. As a result, in this invention, a specification in C language is divided into a plurality of processes and each processes is assigned, as shown in FIG. 3, to each VUs in a plurality of VUPUs 10 composing a data processing system such as the system LSI 30. Therefore, there is the benefit that the processes and functions are performed by specialized circuits and the further benefit of the possibility of these specialized circuits operating in parallel. This means that a system LSI 30 with an extremely high processing speed can be produced.

Figure 5:
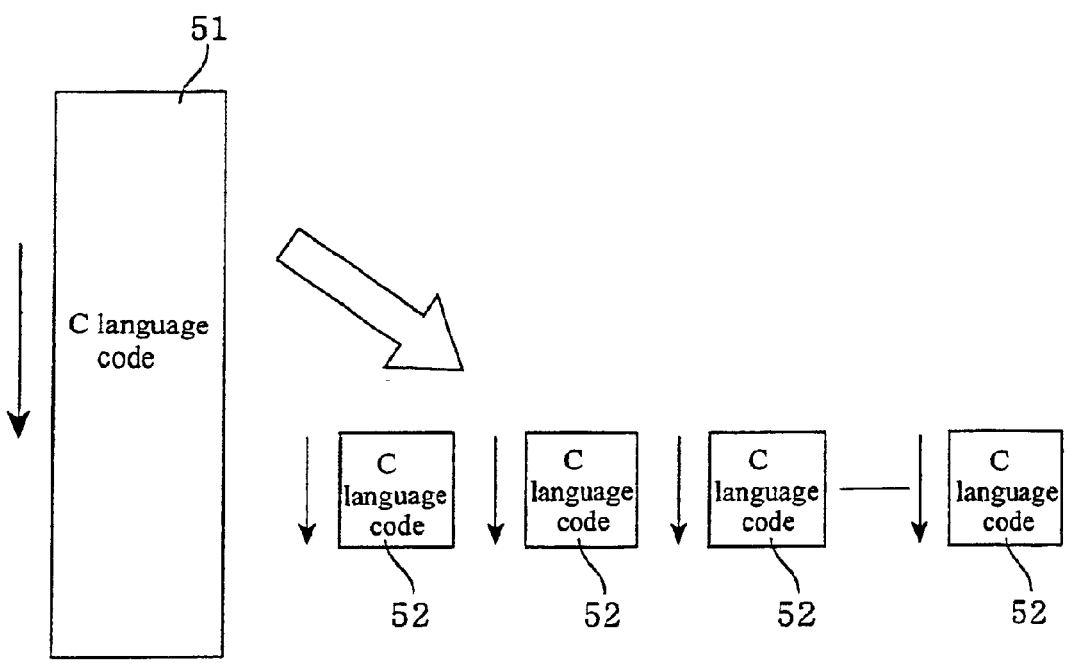
FIG. 5 shows how a program of C language is divided for execution by distributed processing.

As shown in FIG. 5, when a specification 51 written in C language is provided, the specification can be divided into a plurality of processes 52 for which some degree of parallel execution is possible. After this, the data path unit 20 and the sequencer 21 that form the specialized circuits can generate one or more VUs 1 that can execute all or parts of the processes 52 and provide the generated VUs 1 as VUPUs 10. By combining VUPUs 10 that have been generated in this way to form a system LSI 30, the system LSI 30 capable of processing with a high degree of parallelism can be provided. In a VUPU 10, processing that is not suited to execution by the specialized circuits can be executed by the PU 2 that functions as a general purpose processor, so that parallel processing is not only restricted to the processes by the specialized circuits and can also be achieved for the processes performed by standard processors.

Figure 6:
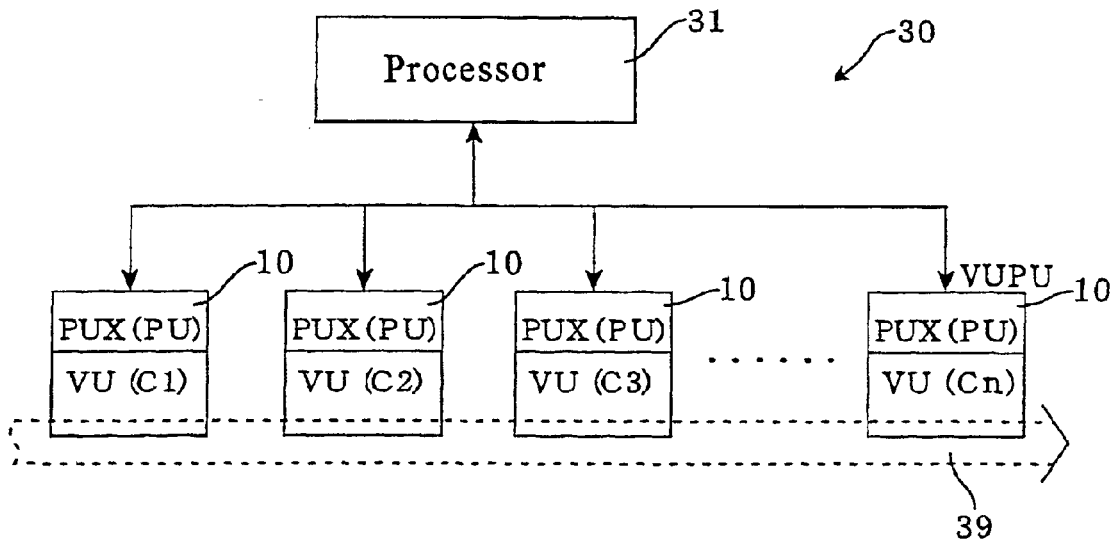
FIG. 6 shows a different example of a data processing system that performs distributed processing using data processing apparatuses according to the present invention.
Figure 7:
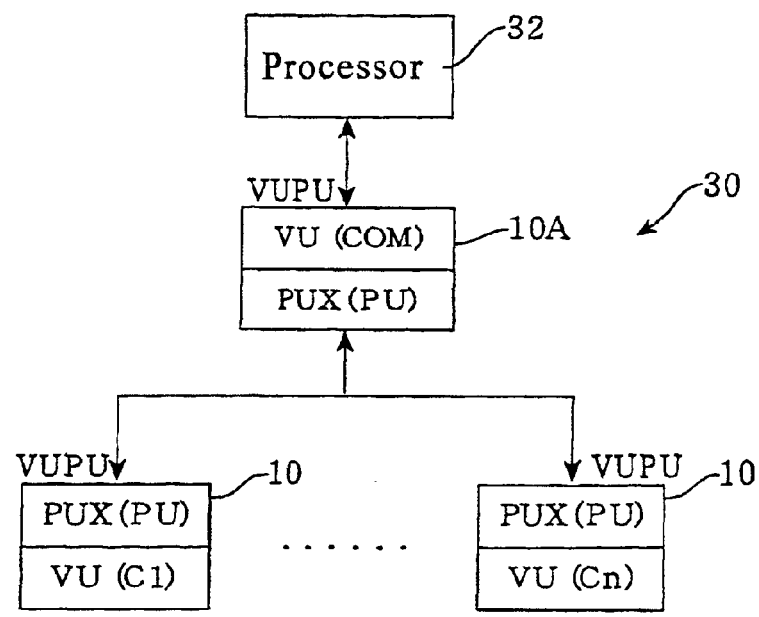
FIG. 7 shows a yet another example of a data processing system that performs distributed processing using data processing apparatuses according to the present invention.
Figure 8:
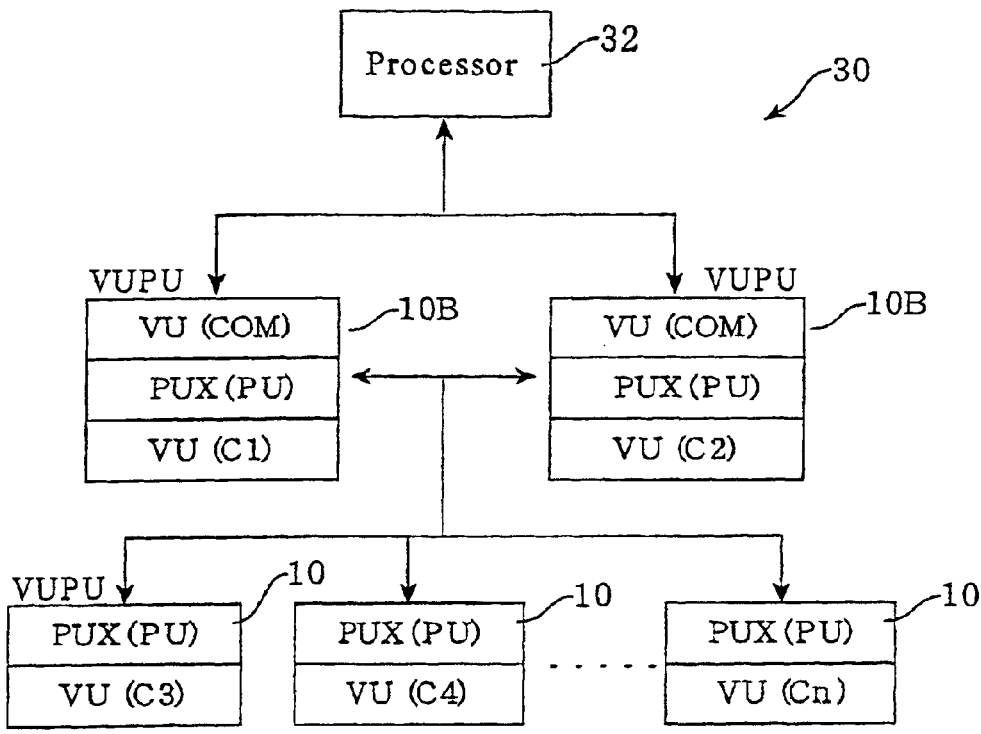
FIG. 8 shows a yet another example of a data processing system that performs distributed processing using data processing apparatuses according to the present invention.

FIGS. 6 to 8 show a number of examples of data processing systems 30 that are composed of the VUPUs 10 of the present invention that have communication functions. It is thought that in many cases, a data processing system 30, with the construction described in the present embodiment where a plurality of VUPUs 10 are provided on a single or common chip, will be able to efficiently execute the processing for a specialized application. In the data processing system 30 shown in FIG. 6, a processor 31 that has an architecture suited to communication with the PUs 2 of the VUPUs 10 is centrally located, with a plurality of VUPUs 10 being connecting using an appropriate communication means. As one example, a required series of processes, such as the compression or decompression of a bitstream 39 composed of image data, can be successively executed by a plurality of VUs 1 that are operated in parallel, so that image processing is performed at high speed. The VUs 1 that perform processing are controlled by the PUs 2, with the PUs 2 exchanging data with other PUs 2 so that appropriate processing can be performed for the synchronizing of processing, arbitration, and the handling of errors. These VUPUs 10 each execute separate pieces of program code, so that by the data processing system 30, a processor or processing system that processes a single data flow by multi-instructions is provided.

The data processing system 30 shown in FIG. 7 includes a VUPU 10 and VUPU 10A having a VU(COM) that provided with a communication function for receiving and transmitting data via a standard bus to connect the VUPUs 10 and a conventional or other type (a second type) of processor 32 that has a different architecture to the VUPUs 10. A data processing system 30 shown in FIG. 8 is an example of a system that has, in addition to the VUPUs 10, VUPUs 10B that have two types of VUs, a VU(COM) and one of VU(C1) and VU(C2), as interfaces between the VUPUs 10 and another type of processor, processor 32. Using PUs 2 that have a communication function, a system including a plurality of VUPUs 10 can be flexibly constructed, so that system LSIs with suitable constructions for a variety of different applications can be realized.

Figure 9:
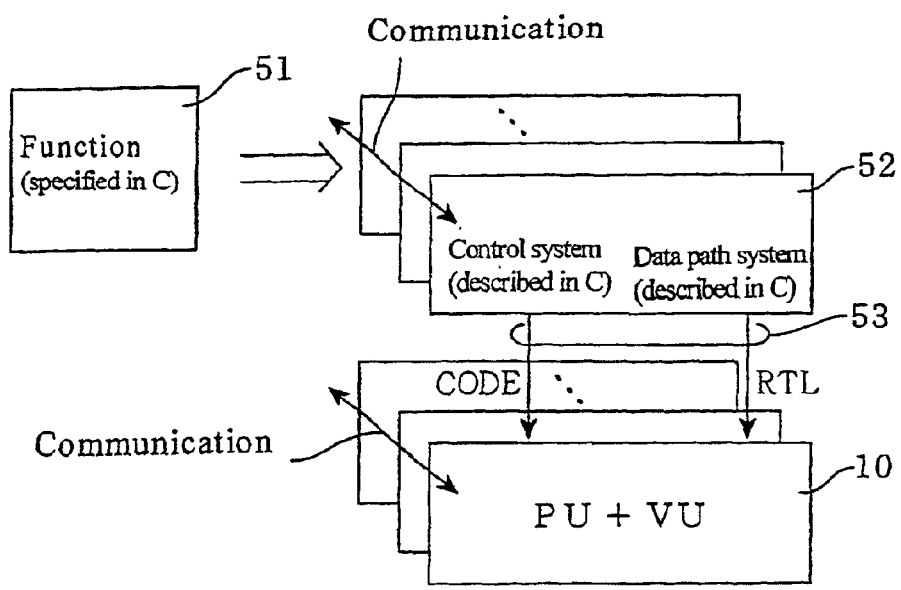
FIG. 9 shows a representation of the procedure for converting functions in C language in VUPUs.

By operating a plurality of VUPUs 10 in parallel as described above, a system LSI capable of extremely fast processing can be realized. To do so, as shown in FIG. 9 it is necessary to divide a function or the specification 51 written in C language into a plurality of processes 52 and to produce a plurality of VUPUs 10. At this point, there is the problem of how data communication is to be performed between the VUPUs 10. A method where data communication is performed between the processor via buses and a method where communication is performed via specialized communication hardware macros are often used. These methods are also applicable in the data processing system 30 of the present embodiment.

However, when buses are used, it is difficult to directly refer to the buses (which are hardware) at the C language level, and when division has been performed into a plurality of processes 52 in C language, precise control cannot be performed for the communication function at the C language level. It is preferable for the transfer of data to be performed without programmers of C language having to consider hardware, so that a data processing system including a plurality of VUPUs 10 can be developed in a short time and at low cost. In other words, when the specification is divided into a plurality of C language processes, if the transferring data are possible in C language level without the programmer having to consider the hardware, the process dividing the specification into a plurality of C language processes can proceed smoothly. This can result in a decrease in the load or time of step 53. In the step53, based on these processes produced by division at the C language level, parts or the processes that are executed by specialized circuits are converted into RTL, the specialized circuits are designed and manufactured using the RTL, program codes that includes special instructions for activating the specialized circuits and general-purpose instructions for other standard processing are produced, and tests are performed.

For this reason, a communication function realized by a hardware architecture where data transfer can be performed freely using C language without having to consider the hardware is very attractive. This type of communication function is, not restricted in the program of C language, useful in a specification described using JAVA, which facilitates distributed and parallel programming, or another high-level language those are favorably used to produce a data processing system realized as a system LSI. In this way, it is possible to provide a data processing system having and data processing apparatuses that are suited to provide a system LSI that are capable of parallel execution of a plurality of processes produced by dividing a specified process.

Figure 10:
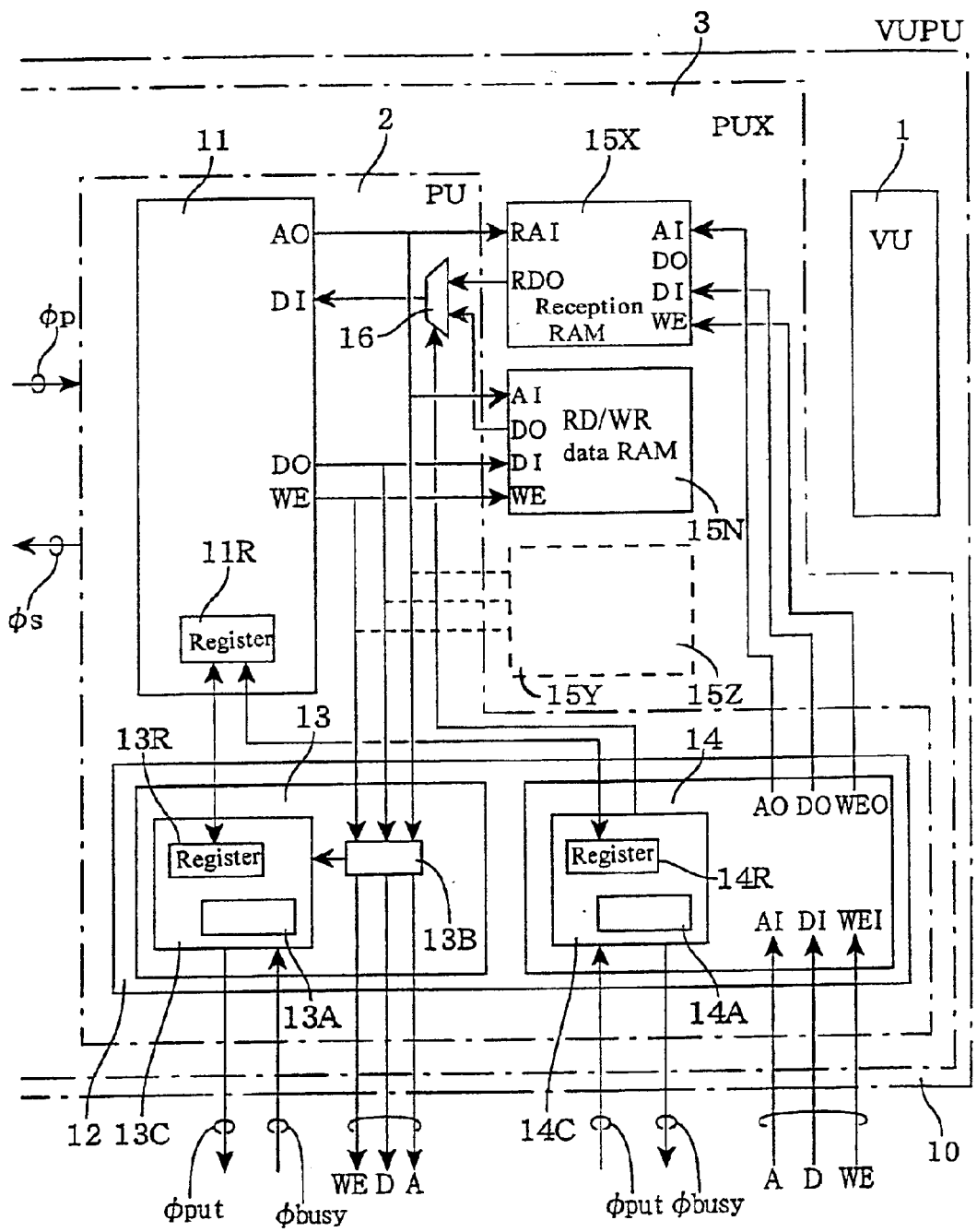
FIG. 10 shows the overall construction of a VUPU that includes a communication function according to the present invention, focusing on a PU.

FIG. 10 shows an example of the VUPU 10 of the present invention, focusing on the PU 2. As described above with reference to FIG. 1, the PU 2 includes an execution unit 11 for executing control signals φp produced by decoding general-purpose instructions in a program stored in the code RAM 4 and a communication unit 12 equipped with a communication function. When an address AO that the execution unit 11 has outputted in order to access the data RAM 15 is an address in a predetermined range or area, the communication unit 12 performs an input/output operation for a reception data RAM or RAM area 15X or a transmission data RAM or RAM area 15Y that differ from a standard RD/WR data RAM or RAM area 15N. The communication unit 12 also exchanges data with other VUPUs 10 by reading out data that has been written in its own reception data RAM 15X and obtaining data from the transmission data RAM 15Y of another VUPU. In other words, the processor PUX 3 of the VUPU 10 in this example has what is known as a arvard Architecture where a code RAM 4 and data RAM 15 are separately provided. By sharing one part of a data RAM with other VUPUs 10 or being equipped with a data RAM that is shared with other VUPUs 10, data can be transferred to other VUPUs by means of an input/output address. This means that by appropriately setting the input/output addresses in C language, communication between the VUPUs 10 can be controlled.

Such communication methods can be roughly classified into a PUT or PUSH type where output data is written into the reception data RAM 15X of the VUPU 10 to receive the communicated data and a GET type in which input data is obtained from the transmission data RAM 15Y of the VUPU that is to transmit the outputted data.

The VUPU 10 shown in FIG. 10 is an example that uses the PUT-type communication method. In addition to the standard RD/WR data RAM 15N from/into which data are inputted and outputted, the VUPU 10 has a reception RAM (reception data RAM) 15X that is read-only for the execution unit 11 in this VUPU 10. The communication unit 12 is also equipped with a transmission interface 13 that transmits output data DO to another VUPU 10 and a reception interface 14 that writes input data DI that has been received from another VUPU 10 into the reception data RAM 15X.

The transmission interface 13 is equipped with a transmission control unit 13C. When an address AO outputted when the execution unit 11 writes data in accordance with a program 4a is equal to or above a given address stored in a configuration register 13R, the transmission interface 13 writes the data into the data RAM (reception RAM) of another VUPU 10 via a transmission buffer 13B. From the viewpoint of the program 4a, by using the same operation that writes data into the data RAM 15N provided in the same VUPU 10, data can be transferred to a virtual transmission data RAM 15Z that does not exist in reality. This non-existent transmission data RAM 15Z is achieved by the data RAM 15X that is present in another VUPU 10 with which communication is being performed. Therefore, the data RAM 15X in the other VUPU 10 is exclusively used for transmission data from the view point of the data transmitting VUPU 10 and the data RAM 15X is exclusively used for reception data from the view point of the data receiving VUPU 10. Therefore, in the receiving VUPU 10 with which communication is performed, the data RAM 15X is read-only for the execution unit 11.

The reception interface 14 is equipped with a reception control unit 14C and writes input data DI (from the viewpoint of the transmitter, the output data DO) received from another VUPU 10 into the reception RAM 15X. The transmission control unit 13C and the reception control unit 14C are respectively equipped with configuration registers 13R and 14R. The transmission configuration register 13R stores the information that is required for transmitting the data outputted by the execution unit 11 to the receiver VUPU, such as identification information (an ID) for the VUPU to receive the data, a transmission start address, a transfer size, and a transmission end address. The reception configuration register 14R stores the data that is required for receiving the data, such as an ID showing the receiving VUPU itself, that is the source of transmitting the data, given addresses such as a reception start address and/or a reception end address. When the address for the non-existent or virtual transmission data RAM 15Z in the transmitting VUPU and the reception address for the data RAM 15X in the receiving VUPU 10 do not match, the conversion of addresses will be performed in transmission or in reception using a correspondence table stored in the configuration register 13R or 14R.

The content of the transmission configuration register 13R and the reception configuration register 14R can be set in accordance with the program 4a via a general-purpose register 11R of the PU 2, for example. As a result, input and output addresses for which transmission and reception are to be performed and the initial conditions for address conversion can be set using C language.

From the content of the address stored in the reception configuration register 14C, it is possible to judge for the data DI that is inputted into the execution unit 11 whether the data DI is to be read from the reception data RAM 15X or from the standard RAM 15N. Output data DO from the reception RAM 15X and output data from the RD/WR data RAM 15N are provided as the data DI for the execution unit 11 via a selector 16 that is controlled by signals received from the reception control circuit 14C. Therefore, by the addresses, the program 4a controls input and/or output of data in the data RAM 15N in which data can be inputted and outputted and data in the reception RAM 15X in which data is written by a transmission source. Other processing for the data is performed in exactly the same way.

The transmission interface 13 is also equipped with an arbitration circuit 13A and transmits a signal φput that shows a data write state. At the start of transmission, it is necessary to check that the receiver of the data is not reading out data at that point. This can be recognized from a signal φbusy that shows a data read state for the reception RAM 15X in the VUPU to which data is to be transmitted. The number of signals φbusy showing the data read state that is equal to the number of processors (no. of IDs) are required for safely transmitting data. The reception interface 14 is also equipped with an arbitration circuit 14A, so that when data is being read from the reception data RAM 15X, data cannot be received from another VUPU 10. When data is being read in the reception data RAM 15X when a signal φput showing a data write state is received, a signal φbusy showing the read state is outputted. The φput signal showing the write state and the φbusy signal showing the read state that are handled by the transmission interface 13 and the reception interface 14 are transmitted in opposite directions but are the same type of signals. These signals are usually expressed as level signals.

The reception data RAM 15X in the present example is a dual-port RAM, though it is also possible for the reception data RAM 15X to be realized by a single port data RAM. When a dual port RAM is used, a read operation can be performed while data is being received, which improves the parallelism of the system and may make it possible to omit the arbitration circuit described above. However, in view of the possibility of the write address AI being the same as the read address RAI, it is still preferable to use the arbitration circuits 13A and 14A and the signals φput and φbusy described above. When omitting the arbitration circuits, in view of the possibility of the write address AI being the same as the read address RAI, a circuit that can output the input data DI as the read data RDO while bypassing the RAM is required.

In this specification, the overall transmission/reception mechanism described above is called an IVC (Inter-VUPU Communication) mechanism.

Figure 11:
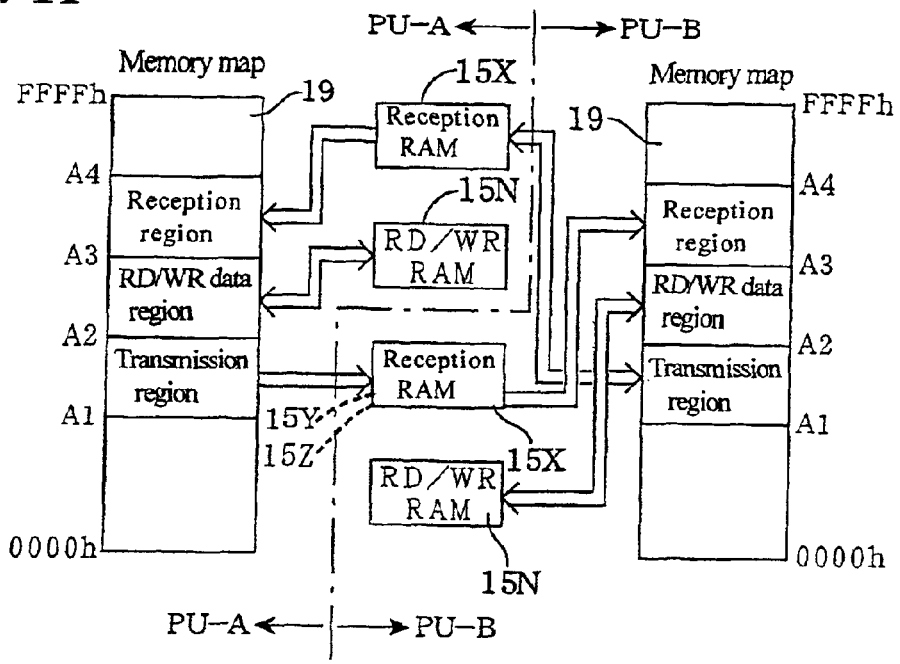
FIG. 11 shows how memory area is used when data is exchanged between two VUPUs.

FIG. 11 shows how data is exchanged between two VUPUs 10 that are equipped with an IVC mechanism, using memory maps 19 for the PUs in the respective VUPUs 10. As can be understood from FIG. 11, in a PUT-type IVC mechanism, when the address in a range of A1 to A2, data is transferred by writing the data in the data RAM 15X of the other VUPU. Therefore, the data RAM 15X of the other VUPU is the virtual RAM 15Z acting as transmission RAM 15Y. In this method, the efficiency with which the data RAMs are used is increased, and data is not stored in more than one RAM, which also helps prevent the occurrence of discrepancies in the data. Also, when the address is in a range A3 to A4, data that has been written in the data RAM 15X by the PU of another VUPU 10 is obtained. As a result, processings are performed using the transferred data in the PU 2.

Figure 12:
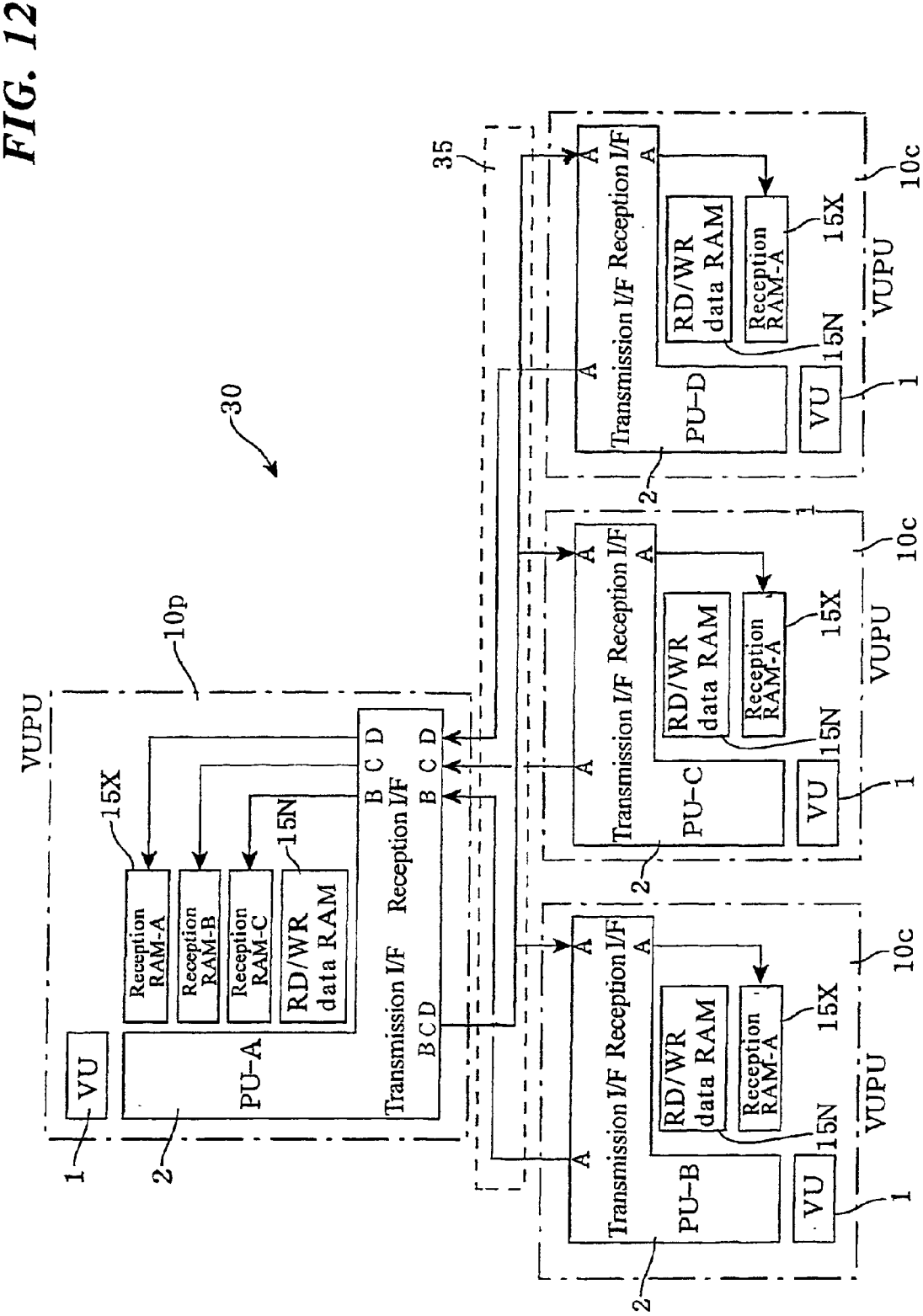
FIG. 12 shows the overall construction of a data processing system in which a parent VUPU exchanges data with a plurality of child VUPUs.

FIG. 12 shows an example of a data processing system 30 in which four VUPUs 10, which are equipped with a PUT-type IVC mechanism, are connected. In the system shown in FIG. 12, one VUPU 10, the VUPU 10p, is the parent or master (upper), with the other three VUPUs 10, the VUPUs 10c, being children or slaves (lower). The same data is transferred from the parent VUPU 10p to all of the child VUPUs 10c, with the child VUPUs 110c separately transferring data to the parent VUPU 10p. In order to do so, the parent VUPU 10p is equipped with a number of reception RAMs or reception RAM regions 15X that is equal to the number of child VUPUs 10c, while each child VUPU 10c is equipped with one reception RAM or reception RAM region 15X. As a result, the parent VUPU 10p can receive data from the child VUPUs 10c in parallel and store the received data respectively, so that the data are used respectively when requirements are occurred during the execution of a program. On the other hand, it is also possible to equip the parent VUPU 10p with only one reception RAM 15X. In this case, the programs of the parent VUPU 10p and the child VUPUs 10c have to be produced so that the parent VUPU 10p receives data from the child VUPUs 10c in order separately.

Also, in the system 30 shown in FIG. 12, a channel 35 that is equipped with four paths for transmitting data is provided between the parent VUPU 10p and the child VUPUs 10c. These data transfer path lines between the processors themselves can be formed using a conventional signal communication process. Also, by increasing the number of channels, it becomes possible to construct the system so that direct communication becomes performed between and/or among the child VUPUs 10c. In this way, variety communication paths become possible freely and easily using the VUPUs with the IVC mechanism of the present invention.

Figure 13:
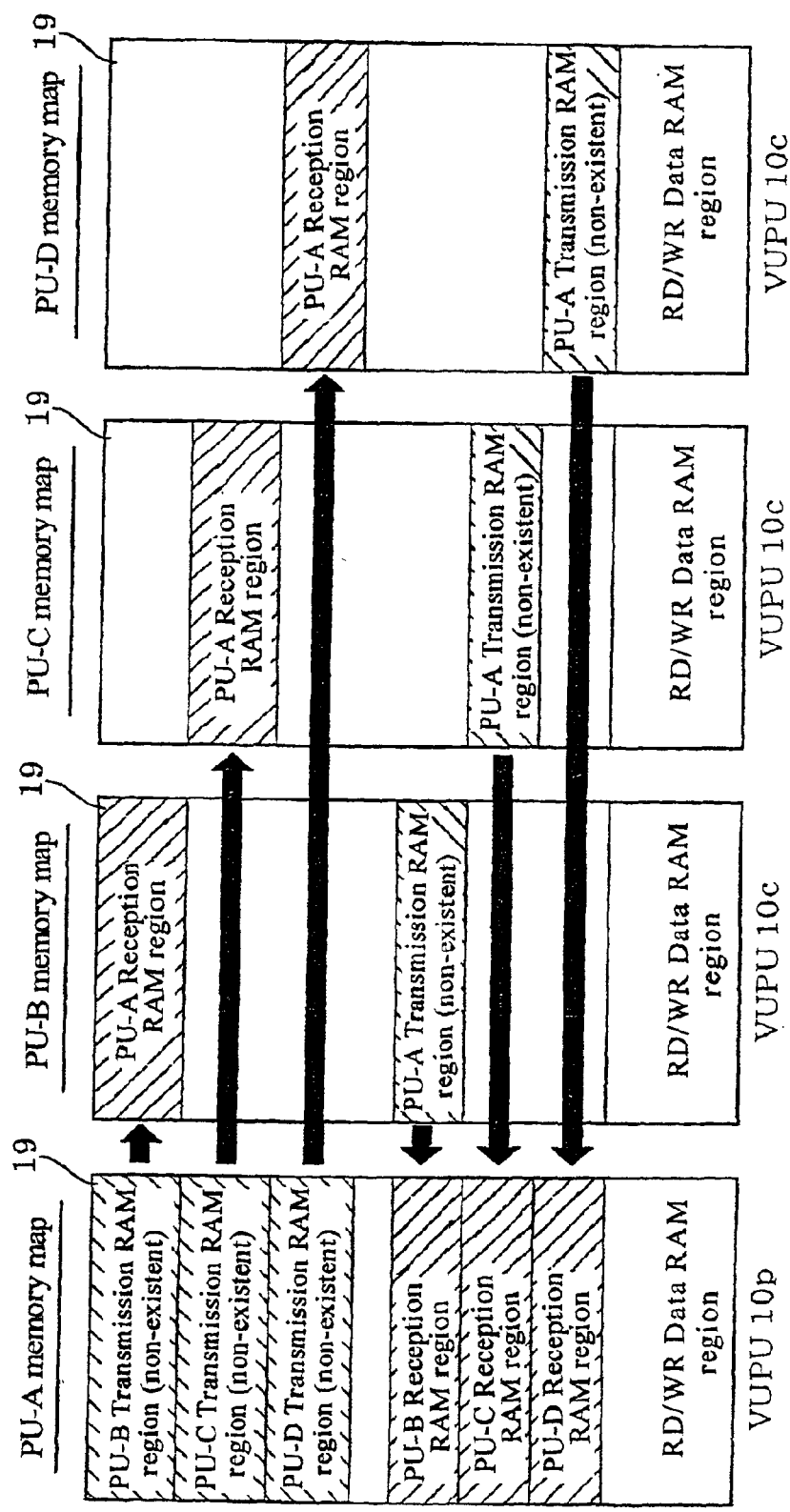
FIG. 13 shows memory maps for each of the PUs in the data processing system shown in FIG. 12.

FIG. 13 shows the memory construction in the PU of each VUPU in the data processing system 30 shown in FIG. 12. As described above, using VUPUs 10 equipped with the PUT-type IVC mechanism, further increasing in the distributed nature of the system and increasing in the usage efficiency of the data RAMs are achieved, even for the case where data is transferred in a one-to-N system. As one example, for the PU (PU-A) in the parent VUPU 10p, the transmission RAM region in the memory map 19 does not exist in reality in the parent VUPU 10p, with the physical data RAM corresponding to these addresses being distributed among the child VUPUs 10c. In the same way, for the PUs (PU-B, PU-C, and PU-D) in the child VUPUs 10c, the transmission RAM regions in the memory map 19 do not exist in reality in the child VUPUs 10c, with the physical data RAM corresponding to these addresses being provided in the parent VUPU 10p.

Figure 14:
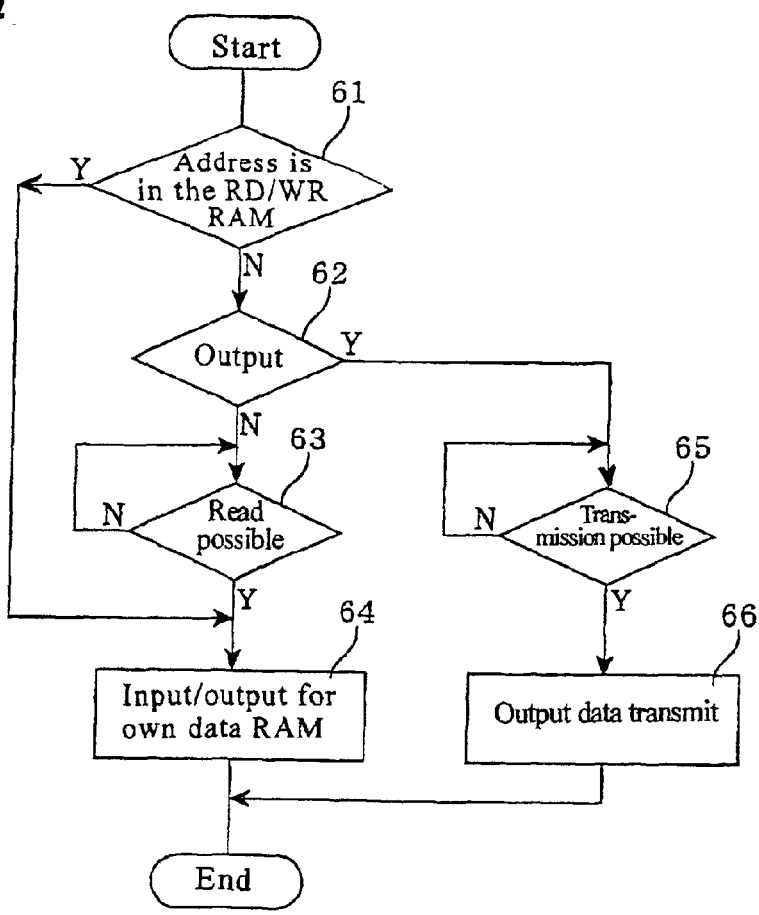
FIG. 14 is a flowchart showing the processing performed by the communication unit.

The operations of the communication unit 12 that realizes the IVC mechanism of the present embodiment are shown by the flowchart given in FIG. 14. Before communication commences, the configuration information such as the ID of the VUPU to which data is to be transmitted, the start address of the data to be transmitted (an address assigned to a non-existent transmission RAM), a start address in the reception RAM 15X and others are set in the transmission configuration register 13R. Also the configuration information such as the ID of a VUPU that is to transmit the data, a start address of the data to be transmitted, a start address of the reception RAM and others are set in the reception configuration register 14R. At the C language level, for example, the settings of the transmission configuration register 13R and the reception configuration register 14R can be set using inline assemble. This processing can also be achieved by setting the required function as a subroutine.

When an input/output address is outputted in accordance with the program, in step 61 the communication unit 12 judges the input/output address of data. When the input/output data does not have an address or within the address region that is assigned to the standard data RAM 15N, in step 62 the communication unit 12 judges from the address whether the process is an input process or an output process. In the case of an input process, in step 63 the communication unit 12, by the arbitration circuit 13A, waits until transmitted data is not being written into the reception RAM 15X, which is to say, the communication unit 12 waits for the end of a write as shown by the write state signal φput. After this, in step 64 the communication unit 12 reads data from its own reception RAM 15X. At the same time, the communication unit 12 sets the read state signal φbusy at "read" or "on" for prohibiting writing. The communication unit 12 sets the read state signal φbusy at the "end" or "off" state once the read is completed.

On the other hand, on judging in step 62 that the current process is an output, in step 65 the communication unit 12 waits, by the arbitration circuit 14A, for the read state signal φbusy to change to the "end" or "off". After that, the communication unit 12 transmits the output data (an address, data, and a write enable signal showing that the address and are valid) to the recipient VUPU 10 in step 66. At the same time, the communication unit 12 sets the write state signal φput at the "write" state for prohibiting read operations. The communication unit 12 restores the write state signal φput to the "write ended" or "off" state when the write is complete. In this way, by using a control method where data is stored in the data RAM 15X of a recipient VUPU 10 by an input/output address, data exchanging becomes easy between or among a plurality of VUPUs 10 by merely controlling or managing the input/output addresses of data in C language level code.

Figure 15:
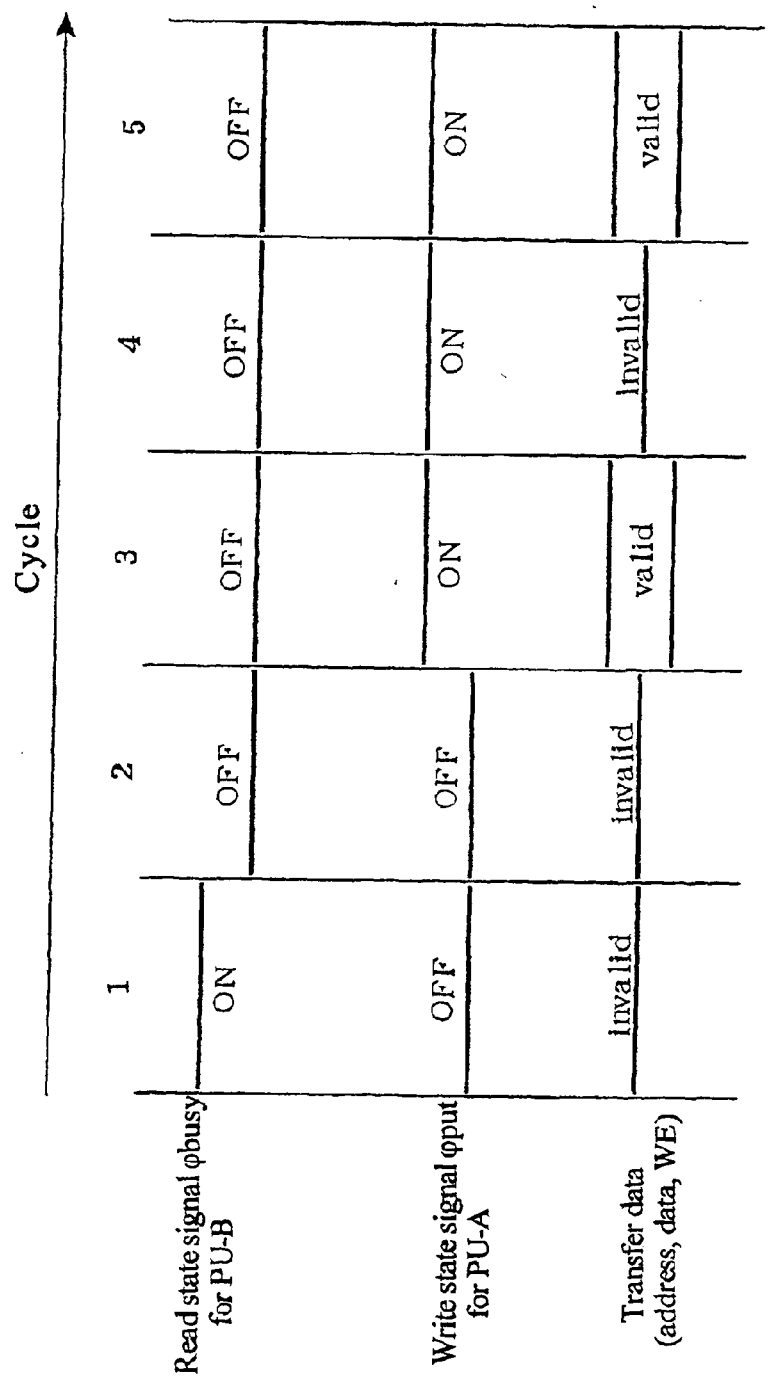
FIG. 15 shows the timing with which the inputting and outputting of data is performed for a reception RAM.

FIG. 15 is a timing chart showing how data from PU-A is written in the reception data RAM 15X of PU-B. In cycle 1, the read state signal φbusy of PU-B is set at ON, so that the transfer data does not become valid and so is not written in the memory. Also, note that a write is only performed an interval of one cycle after the read state signal φbusy has changed to OFF. As a result, in cycle 3 the write state signal φput of PU-A is switched to ON, and the transfer data is transferred to the reception data RAM 15X of the recipient PU-B by means of an address A, data D, and a write enable signal WE. If valid data is transmitted while the write state signal φput is being outputted, this data is written in the reception data RAM15X. In the present example, valid data is shown in cycle 3 and cycle 5.

Figure 16A:
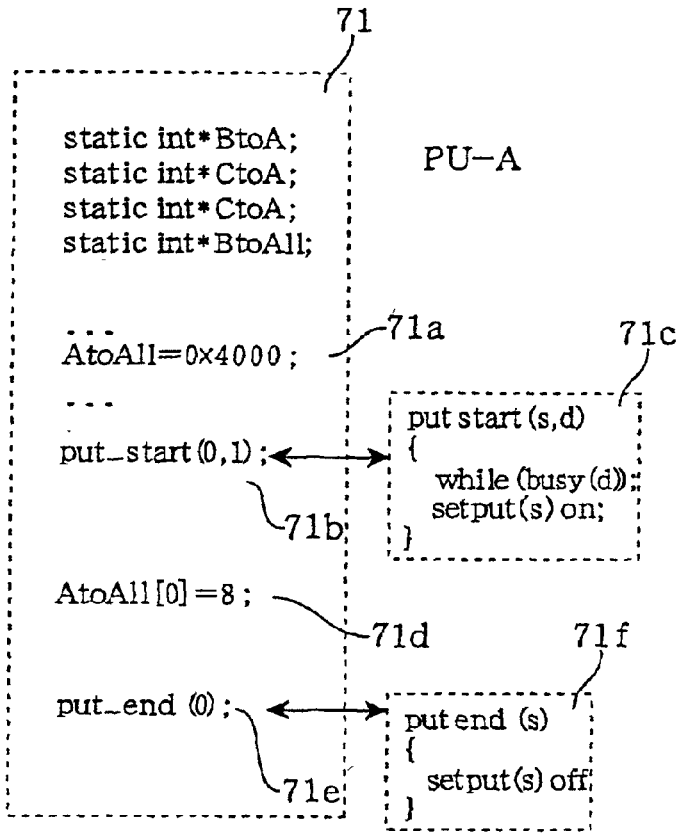
FIG. 16A and FIG. 16B show examples of programs where the processing by the communication unit is controlled using C language.
Figure 16B:
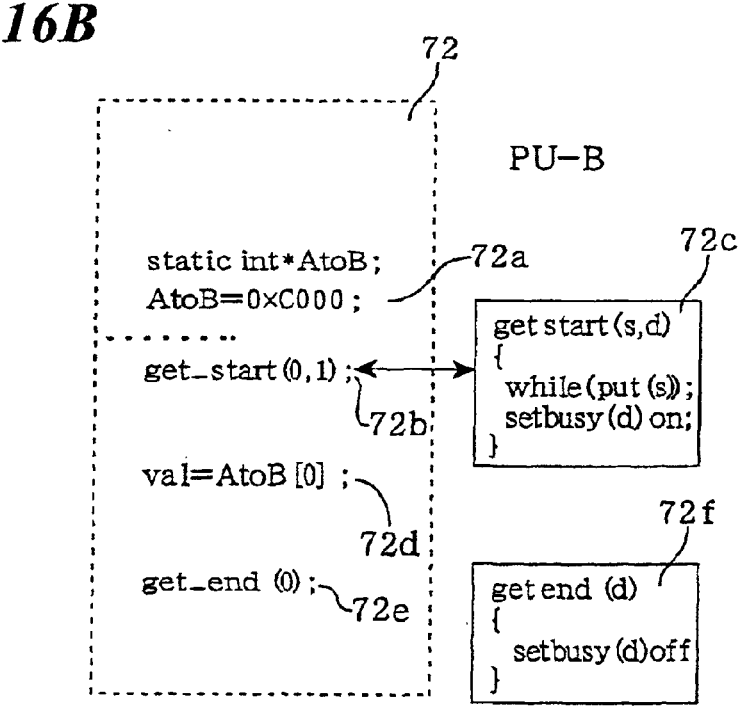

With the IVC mechanism of the present invention, the processing shown in FIG. 14 can be achieved through inclusion in the firmware of the communication unit 12 or by gate logic. It is also possible for all of the data transfer, including the processing shown in FIG. 14, to be controlled through programming at the C language level. FIG. 16A shows transfer procedures of the PU-A for transmitting the data that are described in C language level. FIG. 16B shows the transfer procedures of the PU-B for receiving the data that are described in C language level. In the program 71 of the PU-A, in step 71a the transmission start address is set in the transmission configuration register 13R. Next, in step 71b the transmission for writing data into the reception RAM of the recipient is commenced. At this point, as shown in step 71c, processing that performs a check for the read state signal φbusy of the recipient and sets the write state signal φput at ON may be achieved by a function call to a subroutine. Once the signal has been checked and the various settings have been made, in step 71d the data to be written in is transmitted. When the transmission of data ends, in step 71e the end processing is performed, though as shown in step 71f, processing such as the setting of the write state signal φput at OFF may be achieved by a subroutine.

On the other hand, in the program 72 of PU-B, in step 72a the reception start address is set in the reception configuration register 14C. Next, in step 72b the processing for reading the data from the transmitter that has been written in the reception RAM is commenced. At this point, as shown in step 72c, processing that performs a check for the write state signal φput of the transmitter and sets the read state signal φbusy at ON may be achieved by a function call to a subroutine. Once the signal has been checked and the various settings have been made, in step 72d the transferred data is read and in step 71e the read end processing is performed. Here also, as shown in step 72f, processing such as the setting of the read state signal φput at OFF may be achieved by a subroutine. The setting of the write state signal φput and the read state signal φbusy at ON and the checking of the states of these signals are achieved by register operations. Therefore, a suitable method for performing these processes may be subroutines called using function, with the register settings being made by assemblers separately.

In this way, a communication method that is achieved by the IVC mechanism of the present invention can perform the transfer of data using code expressed at the C language level. As described earlier, by dividing a specification (original specification) described in C language into a plurality of C language processes and producing VUPUs 10 for performing the processes, it is possible to design a system LSI that performs parallel processing and distributed processing for the original specification written in C language. When doing so, the exchanging of data can be directly expressed at a C language level, thereby facilitating the production of VUPUs. As a result, by the IVC mechanism of the present invention, a large decrease is made in the time taken to design and manufacture, from the original specification written in C language, a system LSI that is equipped with a plurality of specialized circuits and is capable of parallel processing. Hence, it becomes possible to provide the system LSIs at low cost.

Figure 17A:
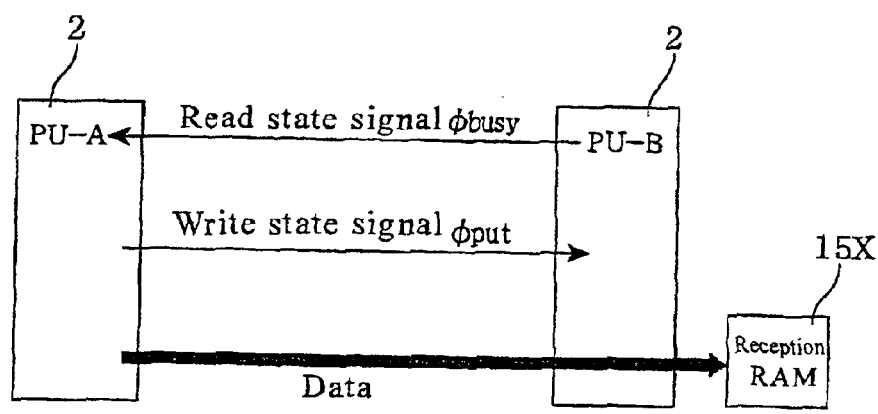
FIG. 17A and FIG. 17B show state signals used for performing arbitration and signal lines corresponding to these state signals.
Figure 17B:
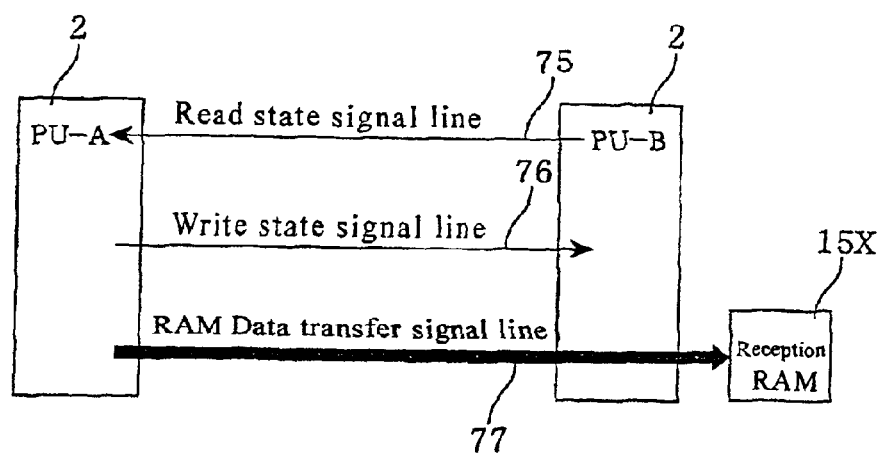

FIG. 17A and FIG. 17B show the transmission of state information between the PU-A that transmits data and the PU-B that receives the data via the signal lines for performing such transmission. As shown FIG. 17A, the read state signal φbusy and the write state signal φput are provided as information that is sent on separate dedicated signal lines. This means that as shown in FIG. 17B, a signal line 77 for transferring data has to be provided in addition to a read state dedicated signal line 75 and a write state dedicated signal line 76 that correspond to these dedicated signal lines.

On the other hand, there is also a method that uses the reception data RAM 15X for the transmission of the state information in place of dedicated signal lines. With the above method that uses dedicated signal lines, it is necessary to perform operations from the C language level via register operations made using assemblers. However, when the reception data RAM 15X is used, a part of reception data will have certain meanings, so that the all of the transfer processing are performed or controlled by data operations made from the C language level.

FIG. 18A shows an example where the transfer procedure of the PU-A that transmits the data is expressed at the C language level, while FIG. 18B shows an example where the transfer procedure of the PU-B that receives the data is expressed at the C language level. In the program 71 of the PU-A, in step 71a the transmission start address is set in the transmission configuration register 13R and in step 71g the address at which the read state signal ɸbusy of the recipient is stored is designated using an address in the reception RAM 15X of this PU-A. When the PU-B that is to receive the data is currently reading the reception RAM 15X, a flag is raised at an address at which the read state signal ɸbusy is stored in the reception RAM 15X of the transmitter. Accordingly, when a VUPU commences the transmission for writing data into the reception RAM of the recipient, first, in step 71h, the state of the recipient is checked by referring to an address in the VUPU's own reception RAM 15X at which the read state signal ɸbusy is stored. Next, in step 71i, a flag is set at the reception start address of the reception RAM 15X of the recipient to indicate the start of a write. In this example, since the data stored at the reception start address show the write state signal 4)put, the data ɸput is stored in step 71i, in step 71j the data to be written in is transferred, and in step 71k data for clearing the flag at the reception start address in the recipient is transmitted, thereby completing the write operation.

On the other hand, in the program 72 of PU-B, in step 72a the reception start address is set in the reception configuration register 14C and in step 72g an address at which the read state signal ɸbusy is stored in the reception RAM 15X of the transmitter is set. When the processing that reads data from the transmitter that has been written in the reception RAM 15X is commenced, in step 72h, a check is performed for the data at the reception start address at which the write state signal ɸput is stored, then in step 72i data is transmitted and a flag is set at the address in the reception RAM 15X at which the read state signal ɸbusy is stored. After this, in step 72j the transferred data is read, and in step 72k data is sent to the address in reception RAM 15X at which the read state signal ɸbusy is stored so as to clear the flag.

In this method, in addition to the data transmitting or receiving, writing and reading state information are held in the reception data RAM 15X of both VUPUs 10. Since communication is performed between the VUPUs 10, holding these information in the reception RAM 15 is not a particular restriction for the present invention. The state of the VUPU 10 with which communication is being performed is written in the reception data RAM 15X of each VUPU 10 as data, so that during a data read process at the C language level it is possible to check whether a read state or write state of the other device has ended.

Figure 19A:
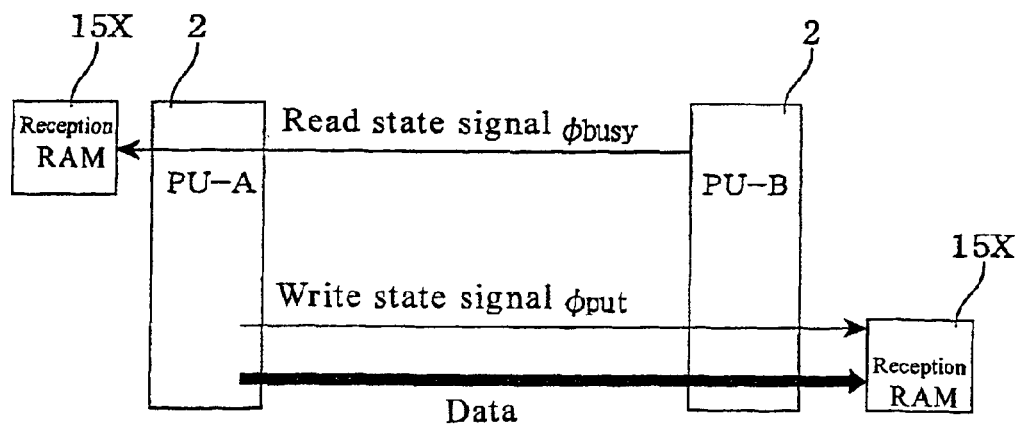
FIG. 19A and 19B show state signals used in a communication method where state signals are written into a reception RAM and signal lines corresponding to these state signals.
Figure 19B:
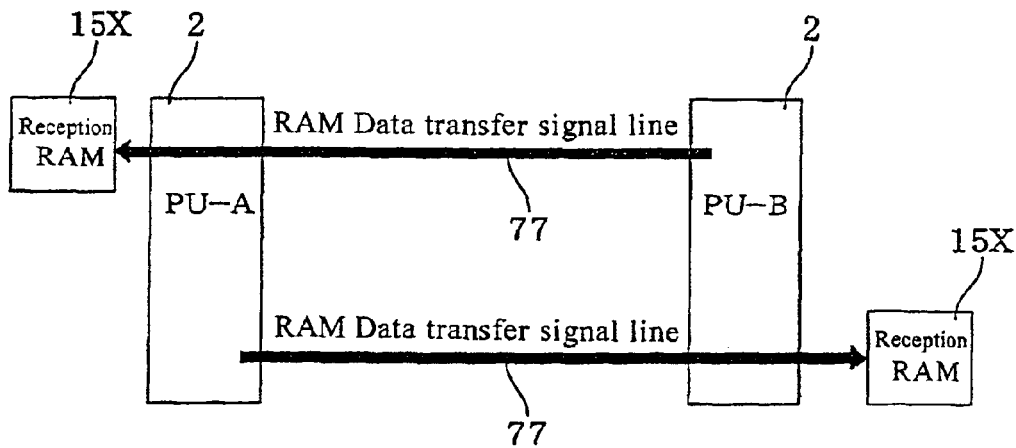

FIG. 19 shows the transmission of state information between the PU-A that transmits data and the PU-B that receives the data in this example via the signal lines for performing such transmission. In this example, as shown FIG. 19A, dedicated signal lines are not required for the read state signal ɸbusy and the write state signal ɸput. This means that as shown in FIG. 19B, the communication channel 35 can be composed of only signal lines 77 for transferring data. Using only the interfaces of the signal lines 77, the transferring procedure or protocol is performed. However, all of this procedure or protocol needs to be included in the program, so that for example, the program needs to include an operation where the number of times data transfer has been performed is shown by a sequence number and a check is performed to see that all of the required transfers have been performed.

Figure 20:
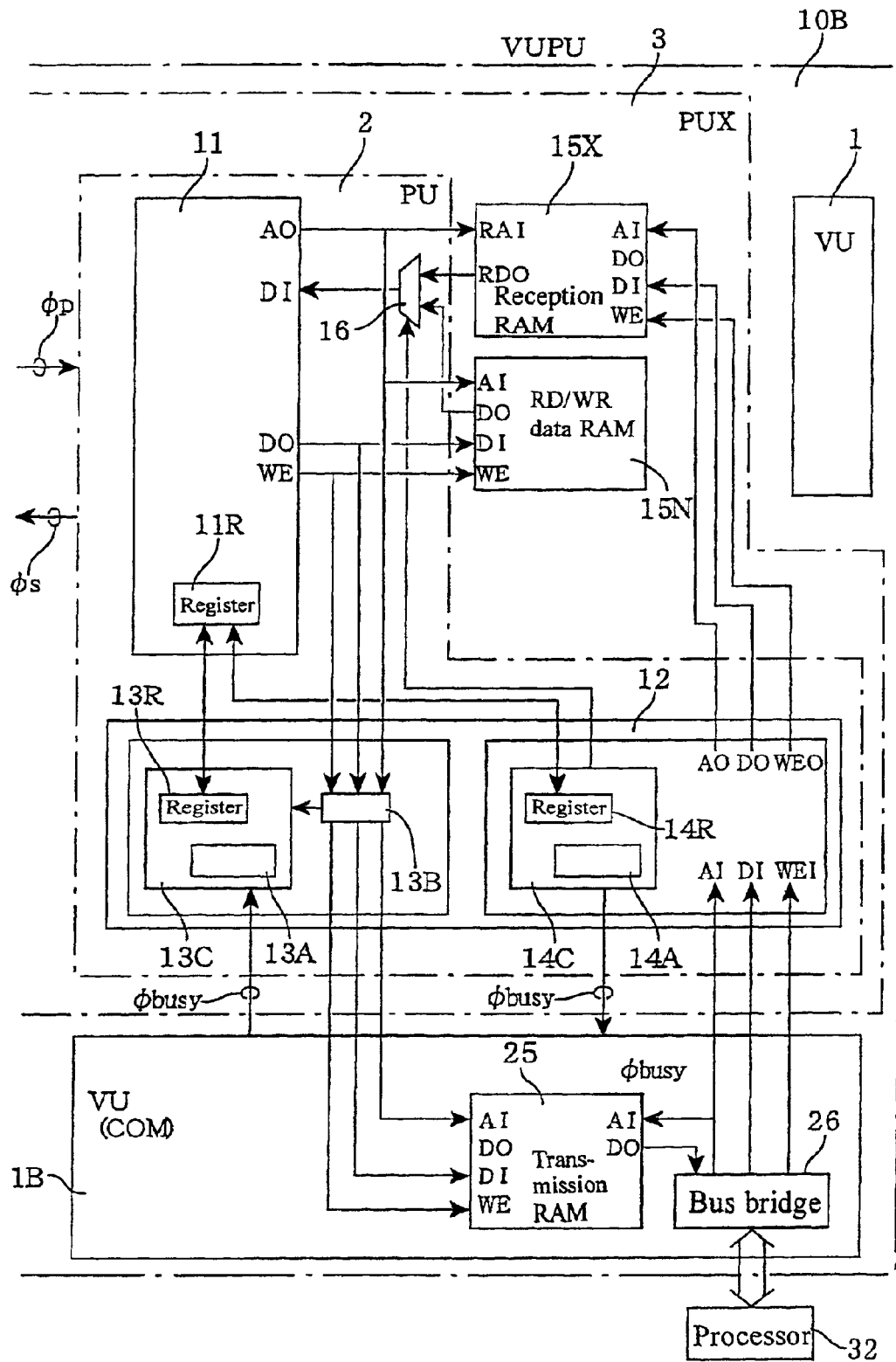
FIG. 20 shows the overall construction of a VUPU that includes a communication function according to the present invention, the VUPU having a VU(COM) equipped with a function for communication with other CPUs and the drawing focusing on the PU.

FIG. 20 shows another example of a VUPU according to the present invention. This VUPU 10B is equipped with a VU(COM) that is equipped with a function for communicating with the standard processor 32 shown in FIG. 8. The VUPU 10 of the present invention is assumed to use an IVC mechanism for performing communication between VUPUs, though many of the processors that are currently in widespread use have a unique bus protocol or communication mechanism, so that by also having communication performed between such processors and VUPUs 10, it becomes possible to construct a data processing system 30 with even greater flexibility. In other words, even when a distributed processing system is constructed of a plurality of VUPUs using an IVC mechanism, there are many cases where it is desirable to use one or more conventional processors alongside the plurality of VUPUs in the system. In such cases also, the VUPU of the present invention can be effectively used.

The VU(COM) 1B in the VUPU 10B shown in FIG. 20 is equipped with a bus bridge function 26 that operates as an interface between the communication unit 12 and the bus of another CPU 32, and a dual port data RAM 25 that is used as a buffer during communication. Also, in the VUPU 10B, since a VUPU interface that is achieved through the transfer of register data between the PU and the VU is provided, the data transferred between the PU 2 and the VU 1B can be performed using the VUPU interface. Consequently, the dual port data RAM 25 acts as a transmission data RAM for transmission to another CPU 32, transmission is performed from the PU 2. On the other hand, reception is performed by connecting, using the bus bridge, the reception interface 14 of the communication unit 12 and the system bus of the CPU 32, the CPU 32 writes data into the reception data RAM 15X.

In the VUPU 10B includes a VU(COM) 1B for communication, while the above IVC function is designed to write data in the reception RAM of the other recipient VUPU, the VUPU 10B writes data in its own transmission data RAM 25. Therefore, the VUPU 10B is equipped with an existent, not a non-existent, transmission data RAM. From that viewpoint, the efficiently use of data RAM that is one of the many merits of the IVC function is hardly obtained. However, it becomes possible to construct the distributed system 30 using a plurality of VUPU 10 and one or more conventional processors. Achieving such system having a different types of processors coexist therein is a large merit, moreover, in the same system, those various type of processes execute in parallel.

Figure 21:
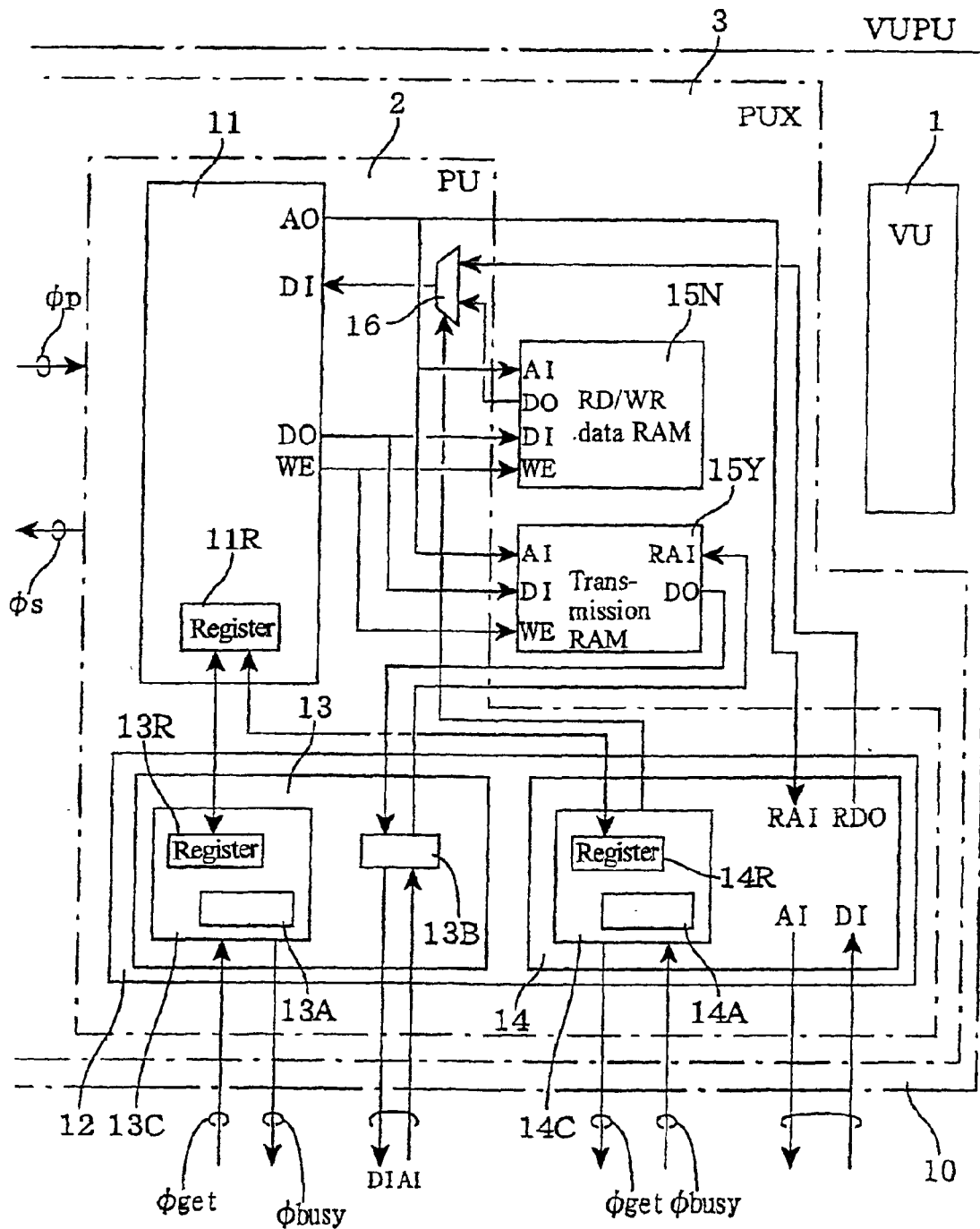
FIG. 21 shows the construction of a VUPU that includes a communication function according to the present invention, the VUPU having a GET-type communication function and the drawing focusing on the PU.

In addition to the system including PUT-type communication units 12, the IVC function is also be achieved by providing transmission RAMs 15Y in place of the reception RAMs 15X and using GET-type communication units 12. FIG. 21 shows an example of the VUPU 10, focusing on the PU 2, having a GET-type communication unit 12.

When the communication unit 12 is a GET-type, the VUPU 10 is provided with a transmission data RAM 15Y that becomes reception data RAM for other VUPUs 10 with which communication is performed. The communication unit 12 is equipped with the transmission interface 13 and the reception interface 14. The respective control units 13C and the 14C in the interface 13 and 14 respectively being equipped with the transmission configuration register 13R and the reception configuration register 14R in which the conditions for transmission and reception is set. That is, the fundamental construction and operation are the same as that of the PUT-type described.

When data is to be written into the communication data RAM 15Y, the arbitration circuit 13A of the GET-type communication unit 12 sets the write state signal φbusy to ON or the write state, and, by transmitting this signal to other VUPUs 10 with the ID of this VUPU, notifies other VUPUs of the write state. On the other hand, the reading of data from transmission data RAM 15Y is performed using a request signal or read state signal get received from a VUPU with which communication is being performed. A transmission control unit 13C that includes the arbitration circuit 13A, when it has received the request signal φget and reading becomes possible, sets the write state signal φbusy into readable and transmits it along with the ID of the VUPU 10 for notifying the VUPU 10 with which communication is performed is now ready for reading. As a result, the reception interface 14 of the other VUPU 10 with which communication is being performed transmits an address and reads the required data. In this system, when the PU 2 reads data from a device with which communication is being performed, the request signal φget is used to check the busy signal φbusy (it should be obvious that a ready signal φready may be used alternatively) for supplying the reading PU 2 itself. After this, the data corresponding to the address given to the reception interface 14 is got from the other VUPU 10 and supplied to the PU 2 via a selector 16 controlled by its reception control unit 14C.

Like the reception data RAM 15X described above, it is possible to realize the transmission data RAM 15Y by a dual port data RAM. In this case, a write operation can be performed during transmission, which improves the parallelism of the system. However, when the VUPU is not provided with the arbitration function, it is necessary to provide a circuit that allows the input data DI is directly output as the output data DO bypassing the memory itself in case the read address and the write address is the same.

Figure 22:
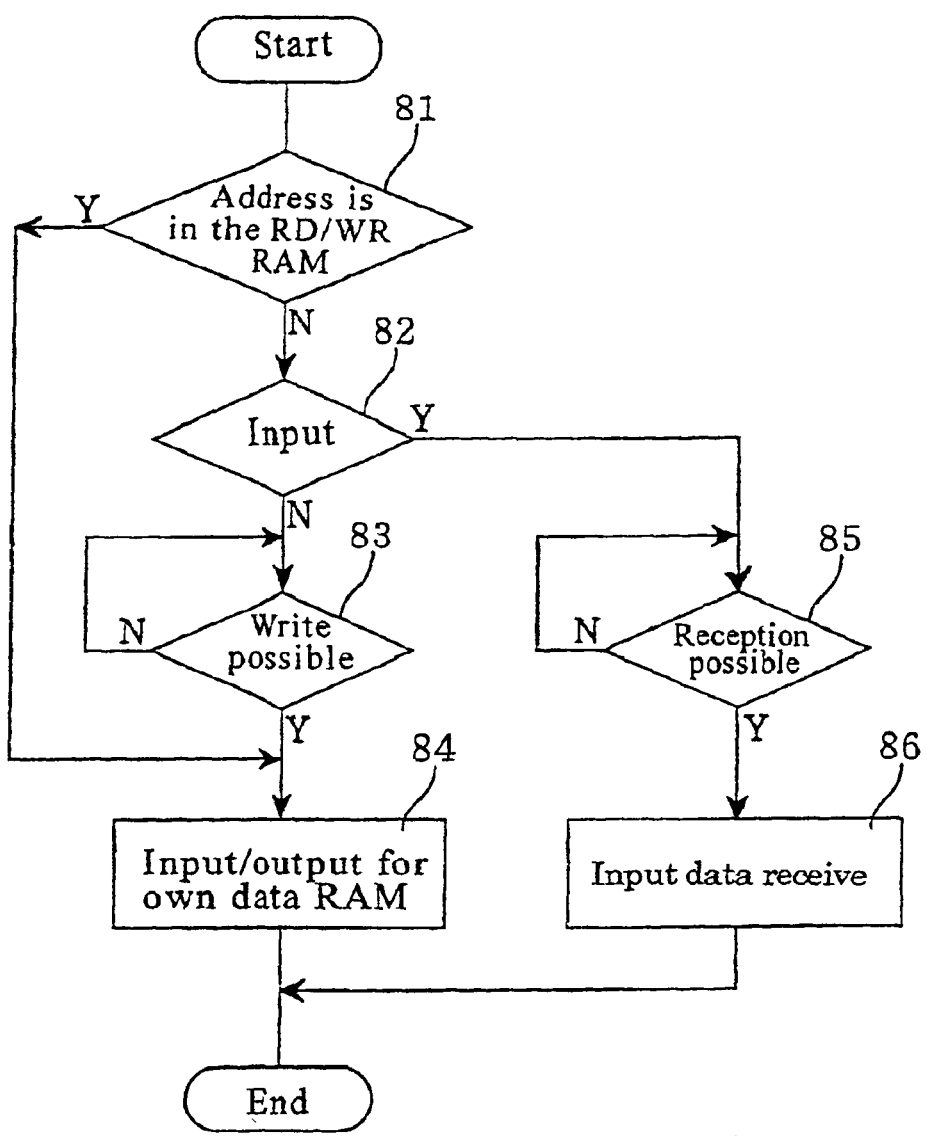
FIG. 22 is a flowchart showing a simplification of the processing by the communication unit of the VUPU shown in FIG. 21.

The operations of the communication unit 12 that realizes the GET-type IVC mechanism of the present embodiment are shown by the flowchart given in FIG. 22. Before communication commences, the ID of the VUPU to which data is to be transmitted, a start address in the reception RAM 15Y, the start address of the data to be received (an address assigned to a non-existent reception RAM) and others are set in the transmission configuration register 13R. The ID of a VUPU that is to receive the data, a start address of the transmission RAM, a start address of the data to be received and others are set in the reception configuration register 14R. At the C language level, the processes of settings to these configuration register 13R and 14R are described inline assemble. Also, this processes are provided as subroutines that act as program function.

When an input/output address is outputted in accordance with the program, in step 81 the communication unit 12 judges the input/output address of data. When the input/output data does not have an address or within a range of address that is assigned to a standard data RAM, in step 82 the communication unit 12 judges from the address whether the process is an input process or an output process. In the case of an output process, in step 83 the communication unit 12 confirms data is not being read from the transmission RAM 15Y, which is to say, the communication unit 12 waits for the end of reading shown by the read state signal (the request signal) φget. After this, in step 84 the communication unit 12 writes data into its own transmission RAM 15Y. At the same time, the communication unit 12 sets the write state signal φbusy at "write" or "on" for prohibiting reading. The communication unit 12 sets the write state signal φbusy at the "end" or "off" once the write is completed.

On the other hand, on judging in step 82 that the current process is an input, in step 85 the communication unit 12 outputs the request signal φget in "read" or "on" and waits for the write state signal φbusy to change to "write ended", then receives the data from the transmitter VUPU 10 in step 86. When the read ends, communication unit 12 sets the request signal φget in the "end" or "off" state. In this way, in the GET-type system also, by the control method where data are obtained from the data RAM 15Y of the transmitter VUPU 10 with input/output addresses, data can be easily exchanged between or among a plurality of VUPUs 10 by merely controlling or managing the input/output addresses of data at the C language level. This arbitration processes or protocol may be included in the firmware or be realized by gate logic of the communication unit 12. As already described above, it is also possible for all of the data transfer to be controlled through programming at the C language level.

With both the PUT-type communication method and the GET-type communication method described above, data becomes accessible directly from C language. Therefore, a VUPU can exchange data with another VUPU by reading or writing data in the data RAM of the other VUPU using the same operation as when performing access to its own data RAM. A data processing system 30 that uses VUPUs 10 designed to use the PUT-type communication method is suited to distributed processing where a parent VUPU 10p or another processor transfers the same or common data to a plurality of child VUPUs 10c. The child VUPUs 10c performing multiple accesses to the transferred data and processing it for performing the distributed processing. A data processing system 30 that uses VUPUs 10 designed to use the GET-type communication method is suited to distributed processing where little data is supplied to the child VUPUs 10c from a parent VUPU 10p or another processor, however, each child VUPUs 10c refers to the data independently for performing the distributed processing.

It is also possible to construct a data processing system where both PUT-type operations and GET-type operations are performed. In a data processing system 30, when distributed processing is performed by a plurality of child VUPUs 10c, the child VUPUs 10c refer to data in a parent VUPU 10p a little at a time each other, and when processing being performed, the results of this processing is restored in the parent VUPU 10p. In this system 30, memory becomes effectively used by having data transferred from the parent VUPU 10p to the child VUPUs 10c using the GET-type communication method and having the data returned from the child VUPUs 10c to the parent VUPU 10p using the PUT-type communication method. This system will have only one transmission/reception data RAM that is provided in the parent VUPU 10p. Also, among the various system using the VUPU 10 of the present invention, the data processing system 30 for distributed processing including a single parent VUPU 10p and a plurality of child VUPUs 10c is an extremely simple but very effective base or typical system construction of this invention. Therefore, a data processing system, where only the parent VUPU 10p has memory or memories for transferring data and the memory or memories are shared by other VUPU 40c, is one of the fundamental construction for performing effective distributed processing using the VUPU 10 of the present invention.

Figure 23:
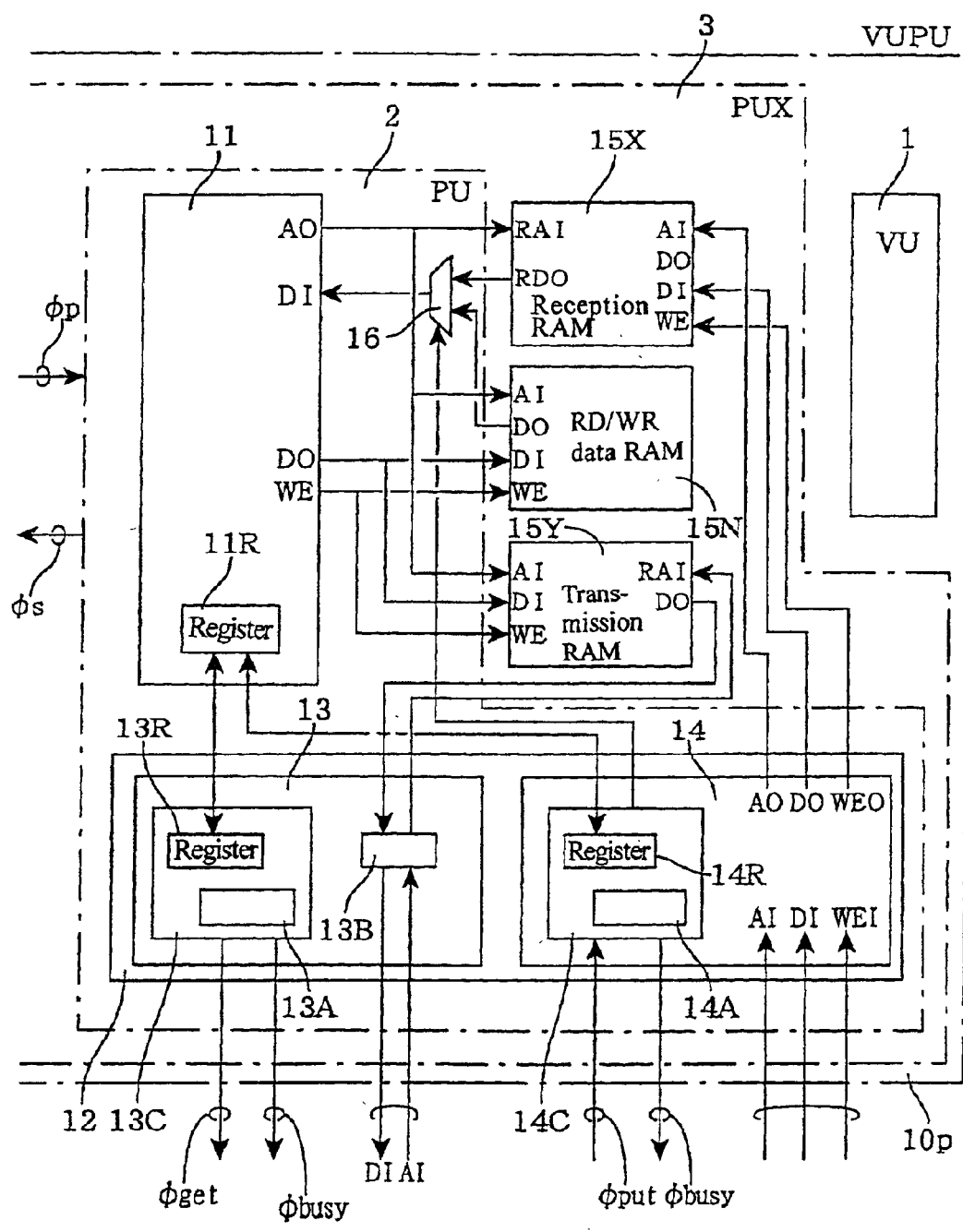
FIG. 23 shows a VUPU that has a first PUT/GET-type communication function according to the present invention.

FIG. 23 shows an example construction of above system in which the parent VUPU 10p includes both the transmission data RAM 15Y and the reception data RAM 15X. In this parent VUPU 10p, the transmission interface 13 of the communication unit 12 has the GET-type construction described above, controls the transmission data RAM 15Y, and performs data transfers based on request signals φget received from the various child VUPUs 10c. The reception interface 14 has the PUT-type construction, and performs data writes based on write request signals φput received from the various child VUPUs 10c.

The arrangement of the parent VUPU 10p shown in FIG. 23 corresponds to a first PUT/GET type system. In the first PUT/GET type system, the communication unit 12 in each of the child VUPUs 10c is equipped with a transmission interface that transmits data to the parent VUPU 10p when the output address is an address or in a range that is set in advance and a reception interface that receives data from the parent VUPU 10p when the input address is an address or in a range that is set in advance. With such VUPUs 10c, the memories 15X and 15Y that form the IVC mechanism can be centralized in the parent VUPU 10p used as the master device, making the usage of memory space in the system highly efficient.

Figure 24:
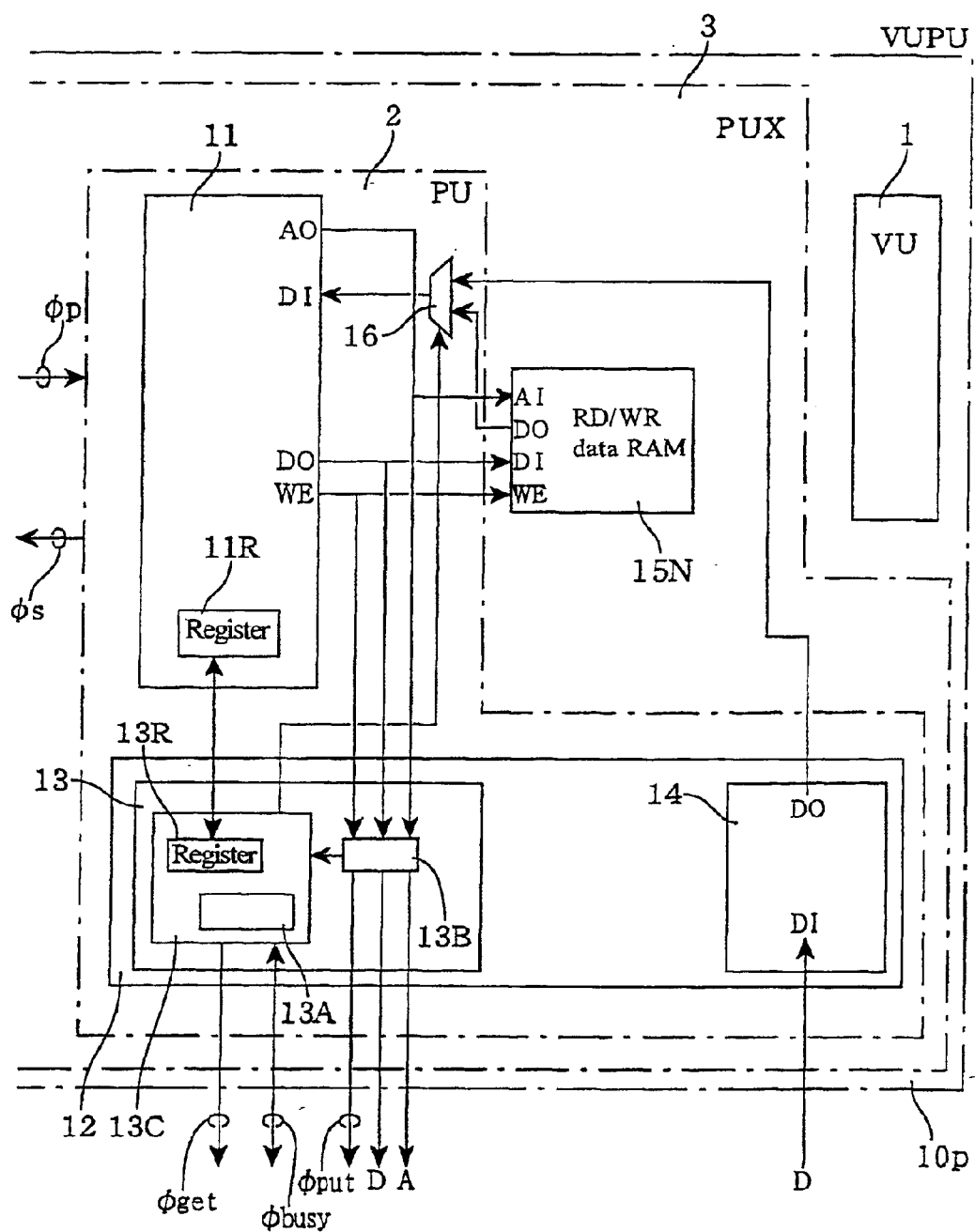
FIG. 24 shows a VUPU that has a second PUT/GET-type communication function according to the present invention.
Figure 25:
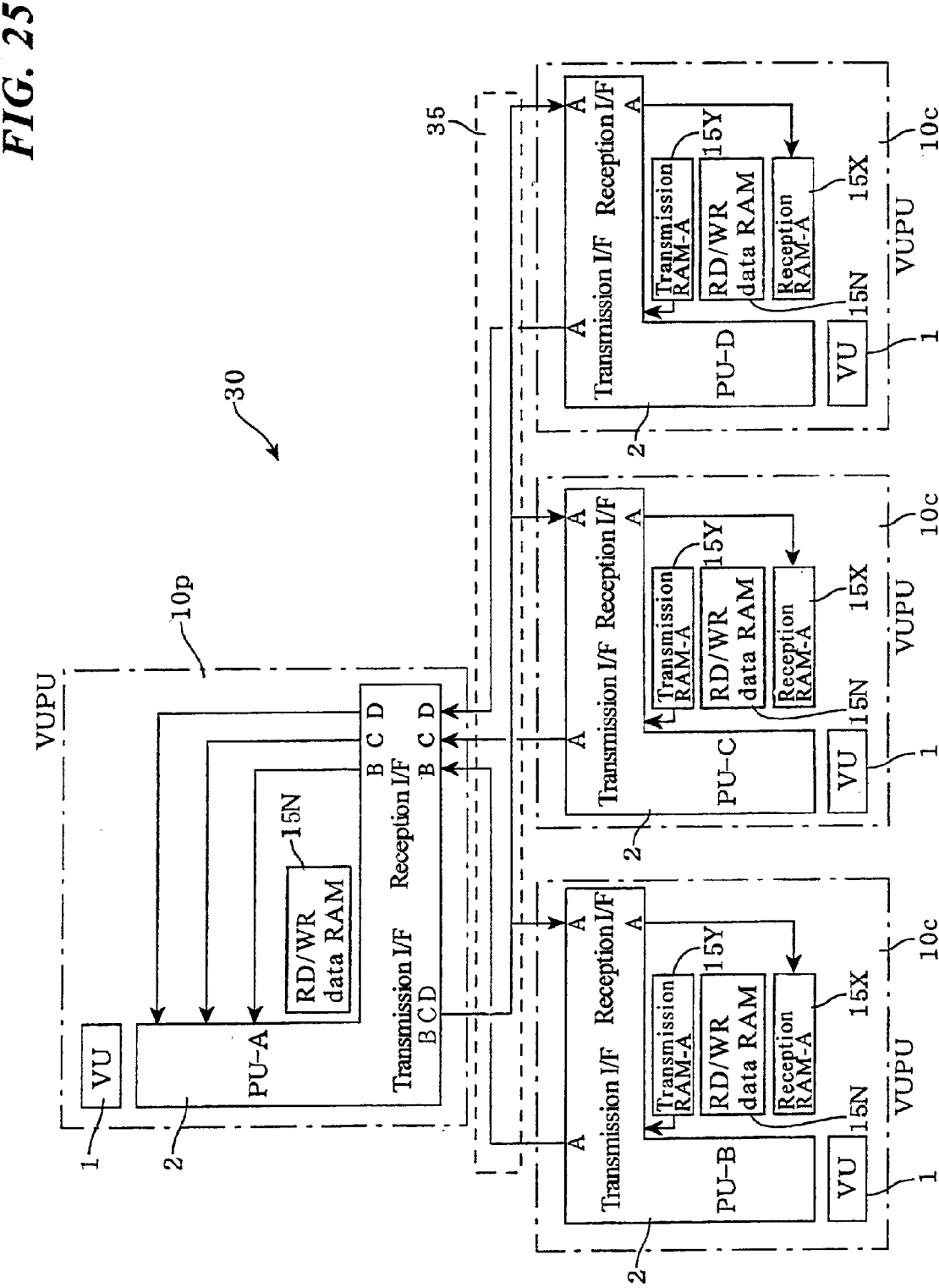
FIG. 25 is a block diagram showing the overall construction of a system that has a VUPU with a second PUT/GET-type communication function as a parent device.

FIG. 24 shows an example construction of a parent VUPU 10p that does not have a transmission data RAM 15Y or a reception data RAM 15X. An overview of a system constructed of this parent VUPU 10p and corresponding child VUPUs 10c is shown in FIG. 25. A transmission unit 13 in a communication unit 12 of this parent VUPU 10p transmits data to a child VUPU 10c when the output address is an address or a range that is set in advance, while a reception unit 14 receives data from child VUPUs 10c when the input address is one of different addresses or ranges that are set in advance. The system shown FIG. 25 is the second PUT/GET-type system described above. In this system, the transmission RAM 15Y and the reception RAM 15X for inputting and outputting the data to be transferred are distributed among the child VUPUs 10c, so that many memories are required. However, since each of the child VUPUs 10c can proceed independently with the distributed processing, thereby increasing the independence of the processing of each child VUPU 10c. Also, in this example, the transmission control unit 13C of the transmission interface 13 acts also as the control unit of the reception interface 14, so that the communication unit 12 becomes simplified construction of only one transmission/reception control unit controls the data transportation.

While the above describes a construction where a standard RAM 15N, a reception data RAM 15X and a transmission data RAM 15Y are provided separately, these can correspond to assigned regions of a single data RAM. Namely, memory area or regions for transmitting or receiving can be assigned to the individual memory unit or a part of the common memory unit. However, there are advantages described above, if dual port RAMs or multi-port RAMs is applied as the reception data RAM and a transmission data RAM. Therefore, in the data processing system where the amount of transferred data does not need to be large, it is preferable for the reception data RAM and the transmission data RAM to be realized using separate data RAMs so that the dual port RAMs or multi-port RAMs is applicable.

As described above, with the present invention a data processing apparatus (VUPU) has a special-purpose data processing unit (VU) and a general-purpose data processing unit (PU). The PU is equipped with a communication function, so that a data processing system in which parallel processing by a plurality of VUs (which is to say, specialized circuits) becomes possible can be developed in an extremely short time and a low cost. The process of converting an entire specification given as a system LSI into hardware is extremely laborious and requires so much time and expense as to be uneconomical in most cases. However, with the VUPU of the present invention, functions that are suited to conversion into hardware can be extracted in suitable units from the specification given as a system LSI, and only functions which are shown to support faster processing during simulations can be converted into hardware in the form of VUs. As a result, limited or only parts of the specification are realized in hardware, thereby simplifying the design and develop processes and minimizing costs. It also becomes possible to maximize the effects of having parts of the processing achieved by hardware. In addition, the VUs produced for processing parts of the specification operat in parallel, that means processes divided from the original specification are distributed among a plurality of VUs and performed in parallel, so thereby making it possible to provide an economical data processing system with high processing efficiency and high processing speed.

Also, with the VUPU of the present invention, processes such as repeated calculations can be extracted in functional units and realized by VUs, which makes high speed processing possible. In addition, the PU, which is a standard processor performs other processing, that suppresses increases in cost due to having processing by hardware and increases in the time required for system design. There is a further benefit in the changes to the specification and changes at different stages in the development process are managed flexibly.

By equipping the PU that is controlled at the program level with the communication function, it becomes possible to perform control over parallel processing at the program level, making it possible to perform extremely flexible control. As a result, a system LSI can be designed and developed in an extremely short time based on a specification written in a high-level language.

To design a data processing system with VUPUs for realizing the original process specified in a high-level language such as C language by divided the original process into a plurality of processes performed by the VUPUs, data transportation or communication between or among the VUPUs is necessary. Especially, for designing data transfer, requesting, returning results and other processing between the divided processes, it is essential to use the communication method where there is a close correspondence between the data transfers and a high-level language such as C language or JAVA. With the present invention described above, by merely setting an address, data can be transmitted to a reception data RAM in a VUPU that is to receive the data or data can be obtained from the transmission data RAM of a VUPU that is to provide the data. Such communication between VUPUs directly performed from C language level as the same method as when accessing a memory makes the transmission and reception of data between the processors free in the level of C language. This makes it extremely easy to design the system in which a plurality of processes that are expressed using C language are executed in parallel. This means that the communication mechanism disclosed by the present invention is ideal for constructing a fast data processing system that uses a plurality of the VUPUs described above.

Although the present invention has been fully described by way of examples with reference to accompanying drawings, it is to be noted that various changes and modifications will be apparent to those skilled in the art. Therefore, unless' such changes and modifications depart from the scope of the present invention, they should be construed as being included therein.

What is claimed is:

1. A data processing system comprising a plurality of data processing apparatuses,
   at least two of the data processing apparatuses being type 1 data processing apparatuses, a type 1 data processing apparatus comprising:
   at least one special-purpose data processing unit that includes a date path portion for specialized data processing that is executed according to at least one special-purpose instruction;
   a general-purpose data processing unit for executing standard processing according to general-purpose instructions;
   an instruction issuing unit for issuing instructions to the at least one special-purpose data processing unit and the general-purpose data processing unit, based on a program that includes the at least one special-purpose instruction and general-purpose instructions;
   wherein the general-purpose data processing unit of the type 1 data processing apparatus includes communication means for exchanging data with the general-purpose data processing unit in at least one other type 1 data processing apparatus;
   the type 1 data processing apparatuses are each equipped with a code memory area for storing the program and a data memory area for inputting and/or outputting data in accordance with at least one of the general-purpose instructions; and
   when one of an input address for an input of data and an output address for an output of data according to one of the general-purpose instructions is in a predetermined address range, the communication means in a type 1 data processing apparatus exchanges data by performing one of an input and an output of data for the data memory area assigned to another type 1 data processing apparatus;
   the communication means of the type 1 data processing apparatus includes means for storing, when data is received from another type 1 data processing apparatus, the data at a corresponding address in the data memory area; and
   the communication means of the type 1 data processing apparatus further includes arbitration means for delaying an operation of the means for storing data when the general-purpose data processing unit is presently reading data from a dedicated reception region in the data memory area in which the means for storing data is to store data, and for delaying an operation of the general-purpose data processing unit that reads data from the dedicated reception region when the means for storing data is presently storing data.

2. A data processing system according to claim 1, wherein at least one of the at least one special-purpose data processing unit is equipped with a function for exchanging data with a type 2 processing apparatus.

3. A data processing system according to claim 1, wherein the communication means of the type 1 data processing apparatus is equipped with transmission means for transmitting data to another type 1 data processing apparatus when the output address is in a predetermined address range.

4. A data processing system according to claim 1, wherein the communication means of the type 1 data processing apparatus is equipped with reception means for receiving data from another type 1 data processing apparatus when the input address is a predetermined address range.

5. A data processing system according to claim 1, wherein the type 1 data processing apparatuses comprise at least one upper data processing apparatus and at least one lower data processing apparatus that communicates with the at least one upper data processing apparatus, and
   the communication means of the lower data processing apparatus includes;
   transmission means for transmitting data to the at least one upper data processing apparatus when the output address is in a predetermined address range; and
   reception means for receiving data from the at least one upper data processing apparatus when the input address is in a predetermined address range.

6. A data processing system according to claim 1, wherein the type 1 data processing apparatuses comprise at least one upper data processing apparatus and at least one lower data processing apparatus that communicates with the at least one upper data processing apparatus, and
   the communication means of the upper data processing apparatus includes;
   transmission means for transmitting data to at least one lower data processing apparatus when the output address is in a predetermined address range; and
   reception means for receiving data from at least one lower data processing apparatus when the input address is in a predetermined address range.

7. A data processing system according to claim 1 further comprises a data processing subsystem being composed of a plurality of special-purpose data processing units of a plurality of type 1 data processing apparatuses for processing a single data stream.

8. A data processing system according to claim 1 further comprises a plurality of data processing subsystems, each data processing subsystem is composed of a plurality of special-purpose data processing units of a plurality of type 1 data processing apparatuses for processing a data stream.

9. A data processing system
   comprising a plurality of data processing apparatuses, at least two of the data processing apparatuses being type 1 data processing apparatuses, a type 1 data processing apparatus comprising:
   at least one special-purpose data processing unit that includes a data path portion for specialized data processing that is executed according to at least one special-purpose instruction;
   a general-purpose data processing unit for executing standard processing according to general-purpose instructions;
   an instruction issuing unit for issuing instructions to the at least one special-purpose data processing unit and the general-purpose data processing unit, based on a program that includes the at least one special-purpose instruction and general-purpose instructions;

wherein the general-purpose data processing unit of the type 1 data processing apparatus includes communication means for exchanging data with the general-purpose data processing unit in at least one other type 1 data processing apparatus;

the type 1 data processing apparatuses are each equipped with a code memory area for storing the program and a data memory area for inputting and/or outputting data in accordance with at least one of the general-purpose instructions; and when one of an input address for an input of data and an output address for an output of data according to one of the general-purpose instructions is in a predetermined address range, the communication means in a type 1 data processing apparatus exchanges data by performing one of an input and an output of data for the data memory area assigned to another type 1 data processing apparatus;

the communication means of the type 1 data processing apparatus includes means for supplying, when data is requested from another type 1 data processing apparatus, the data from a corresponding address in the data memory area.

10. A data processing system according to claim 9, wherein the communication means of the type 1 data processing apparatus further includes arbitration means for delaying an operation of the means for supplying data when the general-purpose data processing unit is presently writing data into a dedicated transmission region in the data memory area from which the means for supplying data obtains data, and for delaying an operation of the general-purpose data processing unit that writes data in the dedicated transmission region when the means for supplying data is presently supplying data.

11. A data processing system according to claim 9, wherein the communication means of the type 1 data processing apparatus is equipped with transmission means for transmitting data to another type 1 data processing apparatus when the output address is in a predetermined address range.

12. A data processing system according to claim 9, wherein the communication means of the type 1 data processing apparatus is equipped with reception means for receiving data from another type 1 data processing apparatus when the input address is a predetermined address range.

13. A data processing system according to claim 9, wherein the type 1 data processing apparatuses comprise at least one upper data processing apparatus and at least one lower data processing apparatus that communicates with the at least one upper data processing apparatus, and the communication means of the lower data processing apparatus includes:

transmission means for transmitting data to the at least one upper data processing apparatus when the output address is in a predetermined address range; and reception means for receiving data from the at least one upper data processing apparatus when the input address is in a predetermined address range.

14. A data processing system according to claim 9, wherein the type 1 data processing apparatuses comprise at least one upper data processing apparatus and at least one lower data processing apparatus that communicates with the at least one upper data processing apparatus, and the communication means of the upper data processing apparatus includes:

transmission means for transmitting data to at least one lower data processing apparatus when the output address is in a predetermined address range; and reception means for receiving data from at least one lower data processing apparatus when the input address is in a predetermined address range.

15. A data processing system according to claim 9, wherein at least one of the at least one special-purpose data processing unit is equipped with a function for exchanging data with a type 2 data processing apparatus.

16. A data processing system according to claim 9 further comprises a data processing subsystem being composed of a plurality of special-purpose data processing units of a plurality of type 1 data processing apparatuses for processing a single data stream.

17. A data processing system according to claim 9 further comprises a plurality of data processing subsystems, each data processing subsystem, is composed of a plurality of special-purpose data processing units of a plurality of type 1 data processing apparatuses for processing a data stream.

18. A data processing apparatus, comprising:

at least one special-purpose data processing unit that includes a data path portion for specialized data processing that is executed according to at least one special-purpose instruction;

a general-purpose data processing unit for executing standard processing according to general-purpose instructions;

an instruction issuing unit for issuing instructions to the at least one special-purpose data processing unit and the general-purpose data processing unit, based on a program that includes the at least one special-purpose instruction and general-purpose instructions;

wherein the general-purpose data processing unit includes communication means for exchanging data with the general-purpose data processing unit in another data processing apparatus;

a code memory area for storing the program; and a data memory area for inputting and/or outputting data in accordance with at least one of the general-purpose instructions;

wherein when one of an input address for an input of data and an output address for an output of data according to the at least one of the general-purpose instructions is in a predetermined address range, the communication means exchanges data with another data processing apparatus by performing one of an input of data and an output of data;

the communication means includes means for storing, when data is received from another data processing apparatus, the data at a corresponding address in the data memory area; and the communication means further includes arbitration means for delaying an operation of the means for storing data when the general-purpose data processing unit is presently reading data from a dedicated reception region in the data memory area in which the means for storing data is to store data, and for delaying an operation of the general-purpose data processing unit that reads data from the dedicated reception region when the means for storing data is presently storing data.

19. A data processing apparatus according to claim 18, wherein the communication means includes transmission means for transmitting data to another data processing apparatus when the output address is in a predetermined address range.

20. A data processing apparatus according to claim 18, wherein the communication means includes reception means for receiving data from another data processing apparatus when the input address is in a predetermined address range.

21. A data processing apparatus comprising:
at least one special-purpose data processing unit that includes a data path portion for specialized data processing that is executed according to at least one special-purpose instruction;
a general-purpose data processing unit for executing standard processing according to general-purpose instructions;
an instruction issuing unit for issuing instructions to the at least one special-purpose data processing unit and the general-purpose data processing unit, based on a program that includes the at least one special-purpose instruction and general-purpose instructions;
wherein the general-purpose data processing unit includes communication means for exchanging data with the general-purpose data processing unit in another data processing apparatus;
a code memory area for storing the program; and
a data memory area for inputting and/or outputting data in accordance with at least one of the general-purpose instructions;
wherein when one of an input address for an input of data and an output address for an output of data according to the at least one of the general-purpose instructions is in a predetermined address range, the communication means exchanges data with another data processing apparatus by performing one of an input of data and an output of data;
the communication means includes means for supplying, when data requested from another type 1 data processing apparatus, the data from a corresponding address in the data memory area.

22. A data processing apparatus according to claim 21, wherein the communication means further includes arbitration means for delaying an operation of the means for supplying data when the general-purpose data processing unit is presently writing data into a dedicated transmission region in the data memory area from which the means for supplying data obtains data, and for delaying an operation of the general-purpose data processing unit that writes data in the dedicated transmission region when the means for supplying data is presently supplying data.

23. A method of control of a data processing apparatus equipped with (1) at least one special-purpose data processing unit that includes a data path portion for specialized data processing that is executed according to at least one special-purpose instruction, (2) a general-purpose data processing unit for executing standard processing according to general-purpose instructions, (3) an instruction issuing unit for issuing instructions to the at least one special-purpose data processing unit and the general-purpose data processing unit, based on a program that includes the at least one special-purpose instruction and general-purpose instructions, (4) a code memory area for storing the program, and (5) a data memory area for inputting and/or outputting data in accordance with at least one general-purpose instructions,
the method comprising a communication step in which data is exchanged with another data processing apparatus when, according to the at least one general-purpose instructions, one of an input address for an input of data and an output address for an output of data is in a predetermined address range.

24. A method of control according to claim 23, wherein the communication step includes a step for transmitting data to the other data processing apparatus when the output address is in a predetermined address range.

25. A method of control according to claim 23, wherein the communication step includes a step for receiving data from the other data processing apparatus when the input address is in a predetermined address range.

26. A method of control according to claim 23, wherein the communication step includes a step for storing data that has been received from the other data processing apparatus at a corresponding address in the data memory area.

27. A method of control according to claim 26, wherein in the communication step, the step for storing data is delayed when the general-purpose data processing unit is presently reading data from a dedicated reception region and, when the step for storing data is presently being performed, an operation of the general-purpose data processing unit that reads data from the dedicated transmission region is delayed.

28. A method of control according to claim 23, wherein the communication step includes a step for supplying data that has been requested by another type 1 data processing apparatus from a corresponding address in the data memory area.

29. A method of control according to claim 28, wherein in the communication step, the step for supplying data is delayed when the general-purpose data processing unit is presently writing data into a dedicated transmission region and, when the step for supplying data is presently being performed, an operation of the general-purpose data processing unit that writes data into the dedicated transmission region is delayed.

30. A data processing system comprising:
a plurality of data processing apparatuses, at least two of the data processing apparatuses being type 1 data processing apparatuses, a type 1 data processing apparatus including at least one special-purpose data processing unit that includes a data path portion for specialized data processing that is executed according to at least one special-purpose instruction; a general-purpose data processing unit for executing standard processing according to general-purpose instructions; and an instruction issuing unit for issuing instructions to the at least one special-purpose data processing unit and the general-purpose data processing unit, based on a program that includes the at least one special-purpose instruction and general-purpose instructions;
wherein the general-purpose data processing unit of the type 1 data processing apparatus includes a communication device for exchanging date with the general-purpose data processing unit in at least one other type 1 data processing apparatus.

* * * * *